(12) United States Patent
Dobney

(10) Patent No.: US 12,375,031 B2
(45) Date of Patent: Jul. 29, 2025

(54) RADIATION DEVICE, SYSTEM, AND METHOD

(71) Applicant: David Dobney, Toronto (CA)

(72) Inventor: David Dobney, Toronto (CA)

(*) Notice: Subject to any disclaimer, the term of this patent is extended or adjusted under 35 U.S.C. 154(b) by 0 days.

(21) Appl. No.: 18/226,252

(22) Filed: Jul. 26, 2023

(65) Prior Publication Data

US 2025/0038703 A1 Jan. 30, 2025

(51) Int. Cl.
| | |
|---|---|
| *H02S 30/20* | (2014.01) |
| *A01G 15/00* | (2006.01) |
| *H02S 20/30* | (2014.01) |
| *H02S 30/10* | (2014.01) |
| *H02S 40/22* | (2014.01) |

(52) U.S. Cl.
CPC .............. *H02S 30/20* (2014.12); *A01G 15/00* (2013.01); *H02S 20/30* (2014.12); *H02S 30/10* (2014.12); *H02S 40/22* (2014.12)

(58) Field of Classification Search
CPC .......... H02S 30/20; H02S 20/30; H02S 30/10; H02S 40/22; A01G 15/00
See application file for complete search history.

(56) References Cited

U.S. PATENT DOCUMENTS

| | | | | |
|---|---|---|---|---|
| 4,762,298 | A * | 8/1988 | Wood | F16M 11/126 |
| | | | | 52/2.25 |
| 5,244,508 | A * | 9/1993 | Colozza | H02S 30/20 |
| | | | | 136/292 |
| 5,660,644 | A * | 8/1997 | Clemens | F24S 20/50 |
| | | | | 136/246 |
| 2004/0055594 | A1* | 3/2004 | Hochberg | F24S 23/745 |
| | | | | 126/696 |
| 2015/0318820 | A1* | 11/2015 | Dobney | F24S 40/85 |
| | | | | 136/259 |
| 2017/0202155 | A1* | 7/2017 | Iwai | E04B 7/18 |

* cited by examiner

*Primary Examiner* — Sadie White

(57) ABSTRACT

The present specification relates generally to solar (and other) radiation concentration and also to a radiation concentration device and method for manipulating weather and climate conditions for crops. The radiation concentration device includes a receiver supported by one or more support cables such that it receives concentrated radiation reflected from the reflective sheet when the reflective sheet is unfurled, a furling and unfurling mechanism and a compressed fluid source that actuates furling, supply of which is controlled. The method of manipulating weather and climate conditions for crops includes releasing a fluid into one or more inflatables such that one or more drums linked thereto rotate and move transversely away from a central position such that the reflective sheet unfurls and hangs from the drums.

23 Claims, 25 Drawing Sheets

RADIATION DEVICE, SYSTEM, AND METHOD

CROSS REFERENCE TO RELATED APPLICATION

This application claims priority from U.S. provisional patent application Ser. No. 63/393,915 filed Jul. 31, 2022, the entirety of which is incorporated herein by reference.

FIELD OF THE INVENTION

The present specification relates generally to solar (and other) radiation concentration and also to a method for manipulating weather and climate conditions for plants.

The present invention relates generally to devices, systems, and methods for reflecting, collecting, blocking, or emitting radiation.

BACKGROUND OF THE INVENTION

In the prior art can be found technology for reflecting, collecting, blocking, or emitting radiation.

In U.S. Pat. No. 9,673,751B2, Dobney describes an invention related to concentrating solar or other types of radiation. Embodiments of the Dobney rotating furling catenary solar concentrator employ a frame that is heavy and costly to construct, which affects the economic viability of the invention.

In U.S. Pat. No. 9,673,751B2, Dobney describes an invention related to arranging reflective surfaces for concentration of solar or other types of radiation. Embodiments of the Dobney rotating furling catenary solar concentrator employ gearing and linkages to achieve furling, the cost and weight of which affect the economic viability of the invention. Furthermore, embodiments of the Dobney rotating furling catenary solar concentrator can be implemented in ganged arrays, which can be difficult to construct.

In U.S. Pat. No. 9,673,751B2, Dobney describes an invention related to collecting or receiving solar energy or other types of radiation. Embodiments of the Dobney rotating furling catenary solar concentrator employ various types of receivers for collecting concentrated radiation, such as photovoltaic and fluid type receivers, which are difficult to implement in an array.

In U.S. Pat. No. 9,673,751B2, Dobney describes an invention related to protecting reflective elements of a concentrating device. Embodiments of the Dobney rotating furling catenary solar concentrator employ actuators the protectively furl a reflective surface in response to only a limited set of conditions.

In U.S. Pat. No. 9,091,462B2, Ratti and Vanzo describe an invention related to providing shade and collecting solar energy. The invention employs a suspended canopy system used for solar concentration and providing shade. However, the invention is heavy, costly, and susceptible to wind damage.

In KR20100123130A ("Sunshine shading structure with solar cell for growing shade plants") an invention is described that relates to shading plants or crops and enhancing growth of plants (particularly shade plants or shade crops). A photovoltaic array is used to shade plants, and the power from the array is used to operate lights that deliver a suitably reduced lighting intensity to the shade plants below. Such a system incurs the high cost of a support structure and of photovoltaic cells.

In U.S. Pat. No. 4,200,904A, Doan describes an invention relating to providing lighting to an area and collecting solar energy. The invention employs solar cells, batteries, that power lights mounted on a post. The invention is costly to construct.

In U.S. Pat. No. 3,902,668A, Daugherty and Eaton describe a center pivot irrigation system that relates to distributing water to an area. Like conventional linear move irrigation systems (and those typical of the mobile drip irrigation system of Thom in U.S. Pat. No. 6,343,749B1), the system requires a truss structure which is expensive, and it is necessary to move the unit through the area/terrain to be watered.

In U.S. Pat. No. 7,048,010B2, Golan and Meisless describe a conventional drip irrigation system, much of which is susceptible to damage by virtue of being on the ground.

Radiation heat losses from warm terrestrial objects (e.g.—plants, crops) is elevated when such objects are in view of a clear night sky (due to the effective "low temperature" of the clear night sky, for example, as described by the Swinbank formula). In U.S. Pat. No. 4,462,390A, Holdrige Taff and Yanda describe an invention that relates to reducing radiative cooling losses from an area. The invention employs thermal barriers that are disposed between plants located within a greenhouse, and the night sky. At certain times, the thermal barriers of the invention are closed to reduce undue radiative heat losses from the plants to the night sky. The invention is costly to construct.

Accordingly, there remains a need for improvements in the art.

BRIEF SUMMARY OF THE INVENTION

The radiation device may concentrate solar or other types of radiation. According to an embodiment, the radiation device provides for arranging reflective surfaces for concentration of solar or other types of radiation. According to an embodiment, the radiation device collects or receives solar energy or other types of radiation. Radiation device may protect reflective elements of a concentrating device.

Radiation device may relate to providing shade. Radiation device may provide shade to plants or crops and thereby enhance growth of plants. According to an embodiment, radiation device provides lighting to an area. According to an embodiment, radiation device may provide shade to an area. According to an embodiment, radiation device may distribute water to an area. According to an embodiment, radiation device may reduce radiative cooling losses from an area. According to an embodiment, radiation device may reduce heat gain of planet earth.

According to an embodiment of the present invention, there is provided a radiation device, comprising: a reflective sheet; a suspension framework; one or more support cables, attachable at each cable end to the suspension framework; a receiver disposed above at least a portion of the reflective sheet that is supported by one or more support cables, such that it receives concentrated radiation reflected from the reflective sheet when the reflective sheet is unfurled; a furling and unfurling mechanism; one or more drums attachable to one or more ends of the reflective sheet; a actuating fluid that actuates unfurling; and a actuating fluid source that is controlled by a controller to adjust actuating fluid supply.

The furling and unfurling mechanism may comprise at least one inflatable coil supported on one end by one of the support cables and attachable on the other end to one or more drums.

The inflatable coil may be attachable to coil springs.

The inflatable coil may unfurl when the actuating fluid is released into the inflatable coils.

The one or more drums may be inflatable.

The one or more support cables may be hollow.

A fluid may flow through the one or more support cables.

An irrigator may be suspended from the suspension framework.

The reflective sheet may hang in a trough shape when in an unfurled position.

The receiver may comprise one or more of: a thermal collector, a photovoltaic cell, or a device that can both emit and adsorb light.

One or more lights may be suspended from the suspension framework.

Multiple receivers, reflective sheets, inflatable coils, and drums may be supported by a single suspension framework.

The suspension framework may comprise one or more arms rotating about a vertical axis in unison, wherein at least one support cable extends from the arms.

The furling and unfurling mechanism may comprise: one or more racks attachable to a central inflatable actuator on an end of each rack, and a pressurized fluid releasable into a central inflatable actuator.

The furling and unfurling mechanism may include a reaction force to a vent fluid.

According to another embodiment, there is provided a method of manipulating weather and climate conditions for plants, comprising: erecting a suspension framework; attaching one or more support cables to the suspension framework; supporting one or more inflatables with the one or more support cables; linking one or more drums to the inflatables; connecting one or more ends of one or more sheets to the one or more drums; and releasing a fluid into the inflatables such that the one or more drums linked to the inflatables rotate and move transversely away from a central position such that the sheet unfurls and hangs from the drums.

The inflatables may be inflatable coils.

The one or more support cables may support two or more receivers, such that the receivers, the inflatable coils, the sheets, and the drums are arrayed along a single suspension framework.

The one or more support cables may be hollow.

The radiation device may furl or unfurl or position the sheet in reaction to analyzing factors comprising one or more of the following: time of day, incoming radiation intensity, incoming radiation direction, level of specular in coming radiation, level of diffuse incoming radiation, wind speed, level or quality of ambient airborne dust or debris, presence of animal pests that may interfere, ambient temperature, desired plant lighting intensity and duration for plants beneath the system, desired plant water duration and intensity for plants beneath the system, estimated night sky temperature with respect to radiative losses from plants beneath the system, availability of actuating fluids, demand for heat from heat load, manual instruction or override, latitude, longitude, or location.

With the foregoing in view, and other advantages as will become apparent to those skilled in the art to which this invention relates as this specification proceeds, the invention is herein described by reference to the accompanying drawings forming a part hereof, which includes a description of the typical embodiments of the principles of the present invention.

Other aspects and features according to the present application will become apparent to those ordinarily skilled in the art upon review of the following description of embodiments of the invention in conjunction with the accompanying figures.

BRIEF DESCRIPTION OF THE DRAWINGS

The principles of the invention may be better understood with reference to the accompanying figures provided by way of illustration of an exemplary embodiment, or embodiments, incorporating principles and aspects of the present invention, and in which.

DETAILED DESCRIPTION OF EMBODIMENTS OF THE INVENTION

Figure 1:
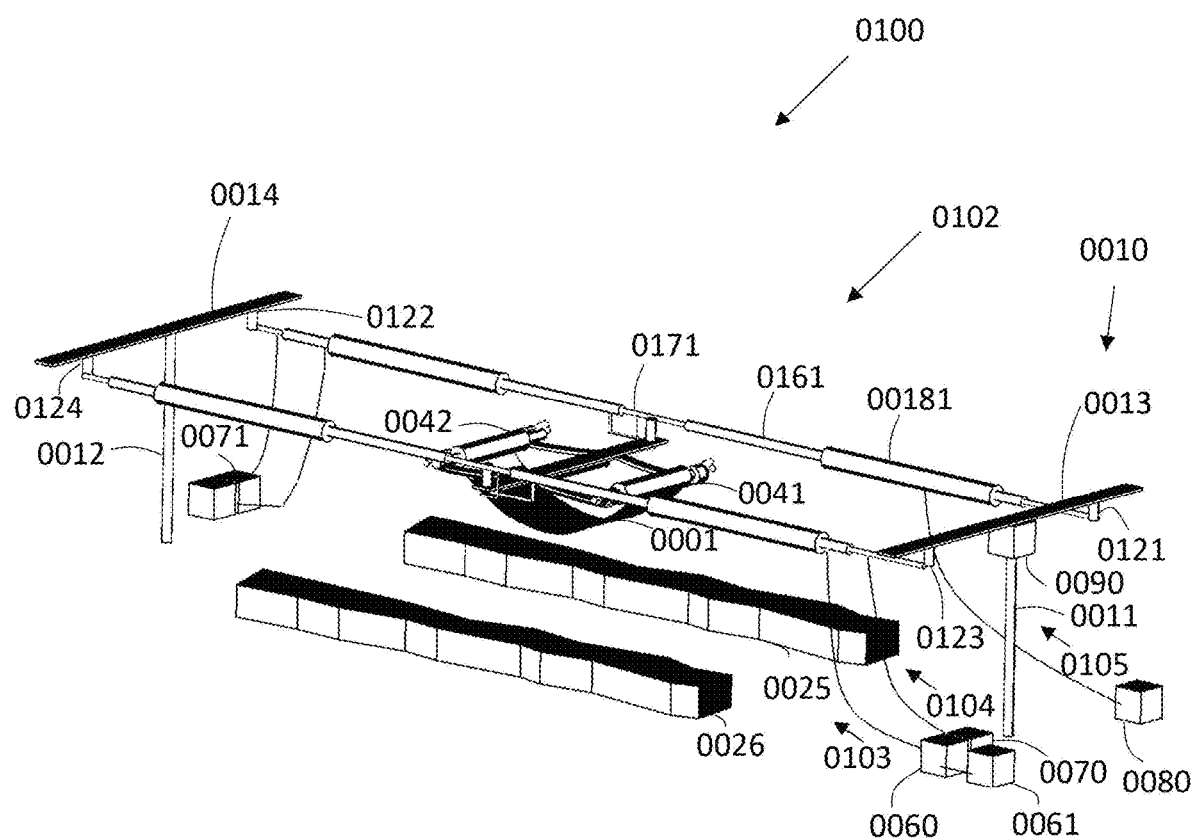
FIG. 1 is an orthographic view of a radiation device, according to an embodiment.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and, in some instances, proportions may have been exaggerated in order to more clearly depict certain features of the invention.

Drawings are not to scale. In some cases, for clarity of presentation, the embodiment presented may be a simplified version of an embodiment more likely to be employed. In certain embodiment descriptions, certain features will be explained in less detail than others, because of commonality with features described elsewhere. In some embodiments shown, thermal insulation is omitted from view for clarity.

According to an embodiment, as shown in FIGS. 1 through 9, a radiation device 0100, thermal receiver, actuating fluid 0103, thermal fluid 0104, irrigation fluid 0105 for solar concentration, energy collection, shading of plants, and nighttime thermal blanketing of plants is described. Accordingly, the radiation device 0100 may provide cost effective radiation concentration and collector, enhance plant growth, etc.

Figure 9:
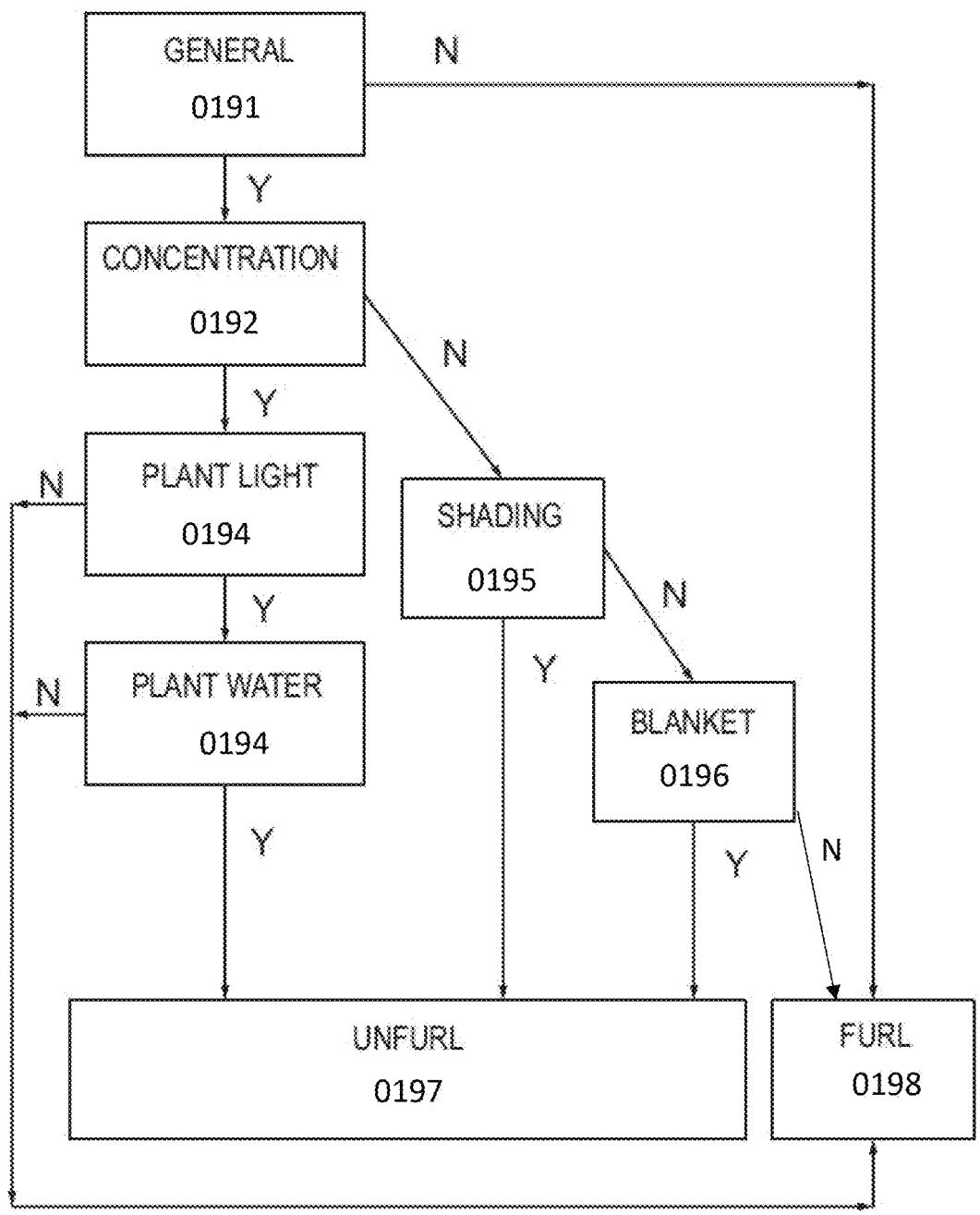
FIG. 9 is a schematic operating logic method diagram for a method of manipulating weather and climate conditions for crops, according to an embodiment.

FIGS. 1 through 8 shows physical aspects of an embodiment of the radiation device. FIG. 9 is a "decision tree" type schematic that shows logic applicable to operation of an embodiment of a radiation device 0100.

According to an embodiment, as shown in FIG. 1 through 8, radiation device 0100 comprises a sheet 0001, which according to an embodiment includes an upper surface that may be reflective, and may be furled at one end on inflatable drum 0041 and at its other end on inflatable drum 0042. Inflatable drum 0041 may be linked via inflate check valves 0151 and 0152 to inflatable coils 0051 and 0052 (also referred to as inflatables) respectively, which may be coiled by coil spring 0055 and 0056 respectively when actuating fluid 0103 is not provided and uncoiled when actuating fluid 0103 is provided from adjoining actuating fluid tubing network 0161. Similarly, inflatable drum 0042 may be linked to inflate check valve 0153 and 0154 and inflatable coil 0053 and 0054, which are coiled by coil springs 0057 and 0058 respectively when actuating fluid 0103 is not provided and uncoiled when actuating fluid 0103 is provided from adjoining actuating fluid tubing network 0162. According to an embodiment, inflatable coils 0051 and 0052 and 0053 and 0054 (also referred to as inflatables) may inflate or deflate by uncoiling or coiling respectively in a similar manner to a "party horn". In some embodiments, economical ball check valves may be employed in the check valve applications (0151, 0152, 0153, and 0154). Inflatable coils 0051, 0052, 0053, and 0054 together comprise a furling and unfurling mechanism 0101.

According to an embodiment, as shown in FIGS. 1 through 8, provision of actuating fluid 0103 causes inflation of inflatable drums 0041 and 0042 as well as of inflatable coils 0051, 0052, 0053, and 0054 (which may be referred to as inflatables), which causes sheet 0001 (which may be reflective) to be unfurled into a trough or catenary shape, which, when rotated appropriately about a vertical axis by positioning system 0090 (such that a horizontal line focus of the catenary shape is parallel to incident radiation) allows incident radiation (e.g.—sunlight) to be reflected and concentrated onto a receiver 0021 (which is located at a line focus region of the catenary shape).

According to an embodiment as shown in FIGS. 1 through 8, the receiver 0021 and inflatable coils 0051, 0052, 0053 and 0054 may be supported by a support 0022. One end of each coil spring 0055, 0056, 0057 and 0058 may be connected to support 0022, and the other end of each is linked to inflatable coils 0051, 0052, 0053, and 0054 respectively.

Support 0022 may be supported by thermal fluid tubing networks 0171 and 0172. In some embodiments, support 0022 protects or covers or houses furled sheet 0001 (which may be reflective) from weather conditions.

In some embodiments, support 0022 and receiver 0021 are integrated into one unit. For example, the two may be integrated as a flat receiver that is encased, or not, in a transparent pane (not shown). For example, the two may be integrated as a circular receiver that is encased, or not, in a transparent pane (not shown).

According to an embodiment as shown in FIGS. 1 through 8, removal of actuating fluid 0103 (or pressure thereof), may cause inflatable coils 0051, 0052, 0053 and 0054 to deflate, and to coil or furl onto themselves, due to torque imparted by coil springs 0055, 0056, 0057 and 0058 respectively, thereby causing inflatable drums 0041 and 0042 (which remain inflated due to check valves 0151, 0152, 0153 and 0154) to rotate and retract centrally towards each other and towards support 0022, which may cause (reflective) sheet 0001 to furl onto drums 0041 and 0042.

According to an embodiment as shown in FIGS. 1 through 8, support 0022, inflatable coils 0051, 0052, 0053 and 0054, coil springs 0055, 0056, 0057, and 0058, and sheet 0001 (or a subset thereof) are implemented to be easily removable to facilitate maintenance or replacement.

According to an embodiment, as shown in FIGS. 1 through 8, coil springs 0055, 0056, 0057, and 0058 are linked to, but separate from, inflatable coils 0051, 0052, 0053 and 0054, and due to this arrangement, replacement of inflatable coils 0051, 0052, 0053 and 0054 (which may deform undesirably over time) is simplified.

In some embodiments, coil springs 0055, 0056, 0057, and 0058 may be integral to inflatable coils 0051, 0052, 0053 and 0054. In some embodiments, coil springs 0055, 0056, 0057, and 0058 pass through a sleeve(s) of inflatable coils 0051, 0052, 0053 and 0054; such an arrangement may allow interconnection (of inflatable coil and coil spring) while facilitating periodic removal of coil spring 0055, 0056, 0057, and 0058. In some embodiments, a coil spring 0055, 0056, 0057, and 0058 may not be included (e.g.—if furling may be facilitated by other means).

In some embodiments, cable stays or supporting elements may be used to guide or assist inflatable coils 0051, 0052, 0053, and 0054 during inflation or after inflation or during deflation or after deflation.

According to an embodiment as shown in FIGS. 1 through 8, inflatable drums 0041 and 0042 may remain inflated. However, in some embodiments, leakage from drums 0041 and 0042 may be tolerated, or may be desired, and may permit a reduced profile to wind loads or other loads in certain conditions, for example, in windy conditions.

In some embodiments, leakable drum material is accepted or desired, thereby allowing usage of economical drum material. In some embodiments, formation of the cylindrical shape of drums 0041 and 0042 may be carried out only just prior to furling, to facilitate furling sheet 0001 (which may be reflective) onto drums 0041 and 0042 (for example, smoothly). In some embodiments, at certain times drums 0041 and 0042 may be deflated such that the cylindrical shape of same is not maintained.

In some embodiments, drums 0041 and 0042 may be equipped with end pieces (not shown) that engage with support 0022 such that, in the furled position, drums 0041 and 0042 may remain in a cylindrical shape, despite leakage of actuating fluid 0103, and by virtue of, for example, tension achieved by engagement of drum end pieces (not shown) with support 0022.

In some embodiments, inflatables drums 0041 and 0042 may be employed; in some solid drums may be employed.

In some embodiments, support 0022 may act as a retraction housing (not shown) that may include flaps, panels, or recesses that cover drums 0041 and 0042 (from weather, wildlife, rain, hail, sand, debris for example) when in the furled position. In some embodiments, flaps or panels may be displaced by drums 0041 and 0042 (or by furling and unfurling mechanism 0101 or components thereof, or by other components that may be linked to furling and unfurling mechanism 0101, or not). In some embodiments, a housing is not employed. In some embodiments, receiver 0021 serves as a support mechanism, with or without the use of support 0022 or retraction housing (not shown). In some embodiments, actuated flaps or spring-loaded flaps may facilitate deflation and stowage. In some embodiments, additional actuators or spring-loaded components may be employed to achieve stowage in a step-wise manner.

In some embodiments, the approximate furled length of the trough or catenary shape formed by sheet 0001 (which may be reflective) may be approximately equal to a sum of circumferences of drum(s) 0041 and 0042 multiplied by a number of revolutions made by drum(s) 0041 and 0042 during unfurling. In some embodiments, wherein a length of inflated inflatable coil(s) 0051, 0052, 0053 and 0054 may be approximately equal to a length of unfurled sheet 0001, or near to it (for example), a required diameter of inflatable drums 0041 and 0042 may be reduced.

According to an embodiment as shown in FIGS. 1 through 8, thermal fluid 0104 may be circulated to receiver 0021 through thermal fluid tubing networks 0171 and 0172. As shown in FIG. 1, tubes of thermal fluid tubing networks 0171 and 0172 may be festooned from arms 0013 and 0014 which may be linked and rotated in unison (each about their respective vertical axis) by positioning system 0090, and thereby receiver 0021 and sheet 0001 may be moved to a position required for radiation concentration.

In some embodiments, thermal fluid tubing networks 0171 and 0172 may be festooned over more than two arms 0013 and 0014, for example, by inclusion of intermediate post-mounted positioning arms.

According to an embodiment as shown in FIGS. 1 through 8, actuating fluid tubing network 0161 and 0162 may form annuli around tubes of thermal fluid tubing networks 0171 and 0172. Irrigation fluid tubing network 0181 and 0182 (also referred to as irrigators) may form an annulus around annular tubes of thermal fluid tubing network 0171 and 0172 or actuating fluid tubing network 0161 and 0162. According to an embodiment as shown in FIGS. 1 through 7, various sections of irrigation fluid tubing network 0181 and 0182 may be perforated, such that, when irrigation fluid 0105 is provided thereto from irrigation fluid supply system 0080 (and, for example, when a positioning system 0090 causes irrigation fluid tubing network to be in a desired position above an area to be watered) irrigation fluid 0105 may flow to the area to be irrigated below.

In some embodiments, an annular tubular arrangement may be exploited for insulative effect, to reduce heat loss from thermal fluid. Additionally, insulation may be added to reduce heat loss from thermal fluid tubing networks 0171 and 0172. In some embodiments, some or all of tubing networks 0161, 0162, 0171, 0172, 0181, 0182 may be arranged in an integrated manner, in others a non-integrated, in others a semi-integrated manner (e.g.—adjacent but non-annular tubes).

In some embodiments, opposing inflatable coils, for example the pair of inflatable coils 0051 and 0053, or for example the pair of inflatable coils 0052 and 0054, or both pairs, may be connected to each other directly. In some embodiments, support 0022 may include channels that distribute actuating fluid 0103. In some embodiments, actuating fluid 0103 may be delivered via an annulus around (at least a portion of) receiver 0021 which may distribute actuating fluid 0103 to inflatable coils 0051, 0052, 0053, or 0054.

In some embodiments, the width of sheet 0001 may be equal to the width of receiver 0021; in other embodiments widths may differ. In some embodiments, two drums 0041 and 0042 may be employed; in some a single drum may be employed, in some more than two drums may be employed.

According to an embodiment as shown in FIGS. 1 through 8, actuating fluid supply system 0060 may be adjusted by actuating fluid control system 0061 according to logic described in FIG. 9, to regulate supply and removal of actuating fluid 0103 according to conditions or criteria, in order to achieve radiation concentration when desired, or shading when desired, or thermal blanketing of plants when desired, or irrigation when desired. In some embodiments, a combination thereof may be achieved.

According to an embodiment, as shown in FIGS. 1 through 8, a thermal fluid supply system 0070 may circulate thermal fluid 0104 (via thermal fluid tubing networks 0171 and 0172) to thermal receiver 0021 to allow collection of heat energy at the focus of the sheet 0001, and to circulate thermal fluid 0104 to a thermal load 0071.

According to an embodiment as show in FIG. 1 through 8, an irrigation fluid supply system 0080 may deliver irrigation fluid 0105 (which may include water or fertilizer or pesticides or nutrients or other constituents) from an irrigation fluid source to an area to be irrigated, via irrigation fluid tubing network 0181 and 0182.

FIG. 9 shows sample logic which may be implemented manually, by computer, by automated systems, or other means, to operate actuating fluid supply system 0060 desirably. Variations to the logic, variations to conditions, variations to criteria, additional criteria, or fewer criteria may be employed. By operating according to certain criteria, an inexpensive or delicate sheet 0001 (which would otherwise not be utilizable) may be employed. Manual or computer or automatic control systems or methods for adjusting actuating fluid 0103 supply (and positioning of sheet 0001) may be referred to collectively as controllers.

According to an embodiment as shown in FIGS. 1 through 9, actuating fluid control system 0061 operates actuating fluid supply system 0060. According to an embodiment as show in FIGS. 1 through 9, actuating fluid control system 0061 receives or stores information as input which may include current actual data or future estimated data comprising: time of day, incoming radiation intensity, incoming radiation direction, level of specular incoming radiation, level of diffuse incoming radiation, wind speed, level or quality of ambient airborne dust or debris, presence of animal pests that may interfere, ambient temperature, desired plant lighting intensity and duration for plants beneath the system, desired plant water duration and intensity for plants beneath the system, estimated night sky temperature with respect to radiative losses from plants beneath the system, availability of actuating or thermal or irrigation fluids, demand for heat from heat load, manual instruction or override, latitude, longitude, location. In some embodiments, received or stored information is used to inform control actions.

As shown in FIG. 9, to avoid damage, a "general precondition" to unfurling the sheet 0001 may be that rainfall levels, wind speed, and ambient dust levels are acceptably low (module 0191).

According to an embodiment as shown in FIG. 9, if the "general precondition" is satisfied, a "concentration precondition" may be checked to verify that an intensity of incoming (e.g.—solar) radiation is sufficiently high, sufficiently specular, and arriving at an angle that will result in sufficient energy transfer to receiver 0021 to warrant unfurling, because each unfurling may be associated with some risk of damage or wear (module 0192).

According to an embodiment as shown in FIG. 9, if the "concentration precondition" is satisfied, a "plant lighting precondition" may be checked, to verify that concentration of radiation is more desirable than allowing incoming radiation to pass unimpeded to plants below (module 0193).

According to an embodiment as shown in FIG. 9, if the "plant lighting precondition" is satisfied, a "plant watering precondition" may be checked, to verify that concentration of radiation is more profitable than watering plants below (module 0194). In some embodiments, radiation concentration and plant watering may not occur simultaneously. In some embodiments, radiation concentration and plant watering may occur simultaneously.

According to an embodiment as shown in FIG. 9, if the "general precondition" is satisfied but the "concentration precondition" is not, a "shading precondition" may be checked, to verify that unfurling sheet 0001 will provide shade and a desired (reduced) plant lighting intensity for a desired duration to the plants 0025 below (module 0195). Certain plants may grow more favourably in shade (e.g—arugula, lettuce, hostas, and many other plants). Providing shade to certain plants according to a desired schedule may promote growth, or may affect growth desirably, or may initiate flowering (e.g.—short-day plants) or may provide other benefits. Providing shade to soil (also referred to by the general term plants) may provide benefits.

According to an embodiment as shown in FIG. 9, if the "general precondition" is satisfied but neither the "concentration precondition" nor the "shading precondition" are satisfied, a "blanket precondition" may be checked, to verify that unfurling sheet 0001 is warranted and may prevent undue radiative losses from the plants below, to the night sky, for example (module 0196). Placing a sheet 0001 between the plants and the night sky may in some circumstances reduce radiative losses desirably.

According to an embodiment as shown in FIG. 9, if the preconditions for solar concentration are satisfied (general, concentration, plant lighting, plant watering), or if the "shading precondition" is satisfied, or if the "blanketing precondition" is satisfied, sheet 0001 may be unfurled (module 0197). Otherwise, sheet 0001 may be made to furl (or to remain furled). Actuating fluid supply system 0060, thermal fluid supply system 0070, and irrigation fluid supply system 0080 may be operated accordingly.

In some embodiments, radiation device 0100 may be implemented to concentrate radiation at times, provide shading at times, or provide blanketing at times. In some embodiments, radiation device 0100 may be implemented to achieve only one or some of these functions. According to an embodiment where radiation concentration may be a primary objective, a sheet 0001 that is highly reflective may be employed. According to an embodiment where radiation concentration may not be a primary objective (e.g.—wherein providing shade to plants is a primary objective), a sheet 0001 of reduced reflectivity may be employed.

In some embodiments, when sheet 0001 is unfurled, areas or plants may be shaded from specular radiation (by sheet 0001) but may remain irradiated (or illuminated) with diffuse or scattered light passing adjacent to unfurled sheet 0001. Thereby, a desirably reduced but non-zero light incidence to the plants may be achieved. This may be generally desirable during periods of high radiation intensity (e.g.—near noon), when it is advantageous to both concentrate radiation and to provide shade to shade plants.

Figure 10:
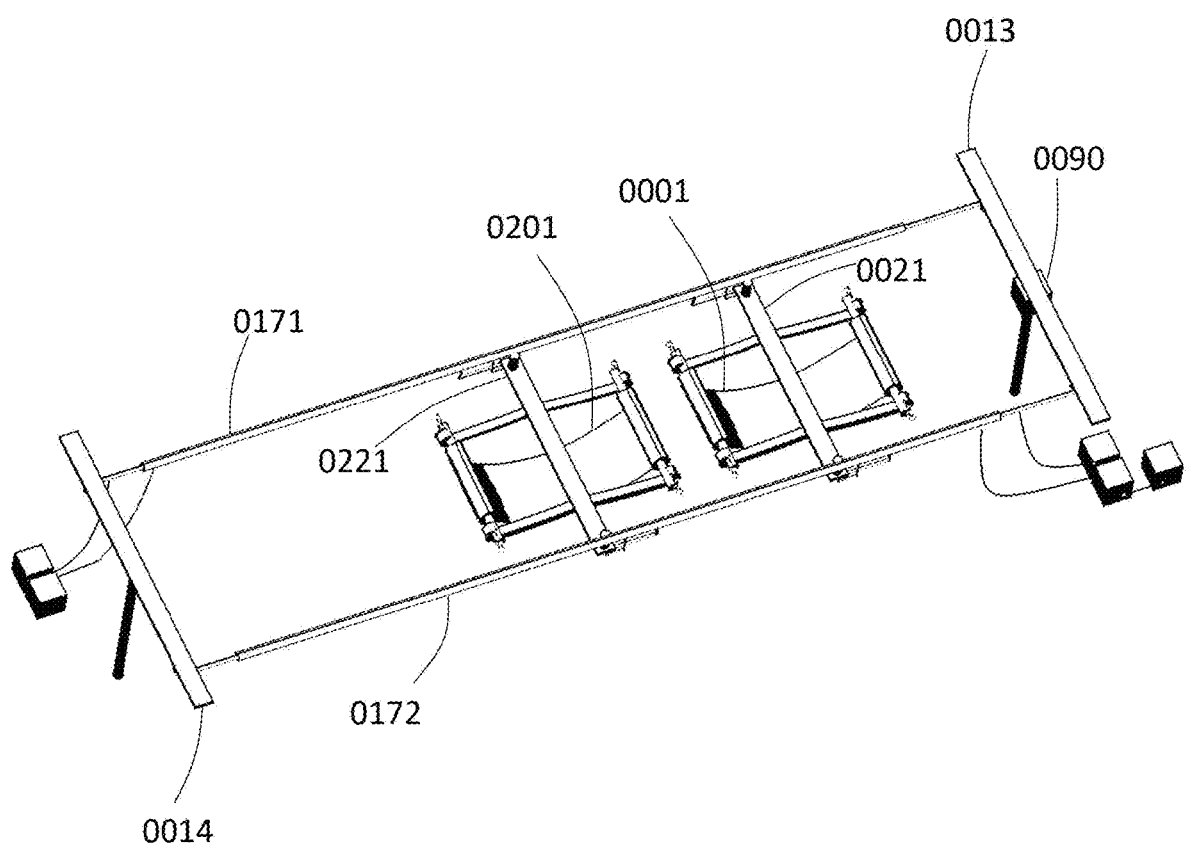
FIG. 10 is an orthographic view of an arrayed radiation device, according to an embodiment.

In some embodiments, as shown in FIG. 10, sheets 0001 are arrayed so as to intercept a higher (or optimal) proportion of radiation across a given area (while unfurled) while admitting a lower (or optimal) proportion of lighting to the plants below. In some such embodiments, the system may be operated to achieve maximum solar concentration at or near midday (when, for example, cosine losses are lowest), and to achieve maximum direct insolation to plants below during certain other times (with surface 0001 furled) for example, when lighting intensity is reduced.

According to an embodiment as shown in FIG. 1 through 9, a common surface (for example, sheet 0001) may be used for concentration and shading. In other embodiments, separate surfaces are used for concentration and shading. In some embodiments, surface 0001 may be partially transparent and partially reflective, which in some embodiments, may permit favourable usage of economic material for surface 0001.

In some embodiments, the surface 0001 may be oriented at times with its reflective face upwards for radiation concentration, and at times downwards to enhance nighttime blanketing. In some embodiments, radiation device 0100 may include a mechanism that rotates inflatable coils 0051, 0052, 0053, and 0054 and related parts 180 degrees along a common horizontal axis, so as to invert the sheet 0001.

In some embodiments, both sides of sheet 0001 may be substantially reflective; in some embodiment one side may be substantially reflective; in some embodiments reflectivity of both sides may be reduced.

In some embodiments, sheet 0001 may be perforated to, for example, reduce an impact of wind loading to an acceptable level.

In some embodiments, actuating fluid control system 0061 may utilize external data (such as environmental data or plant cultivation related data or other data or instructions or wirelessly transmitted data) that is provided from a central source, or remote source, or service provider, etc. In some embodiments, such data may be provided as a paid service. In some such embodiments, a central system, that employs sensors and comprehensive data collection for example, may be leveraged to serve many installations costs effectively. In some embodiments, camera observations and other measurements of plants or soil conditions or conditions affecting plants, in the area or region of the radiation device 0100, may be employed to inform control actions of the actuating fluid control system 0061.

Figure 5:
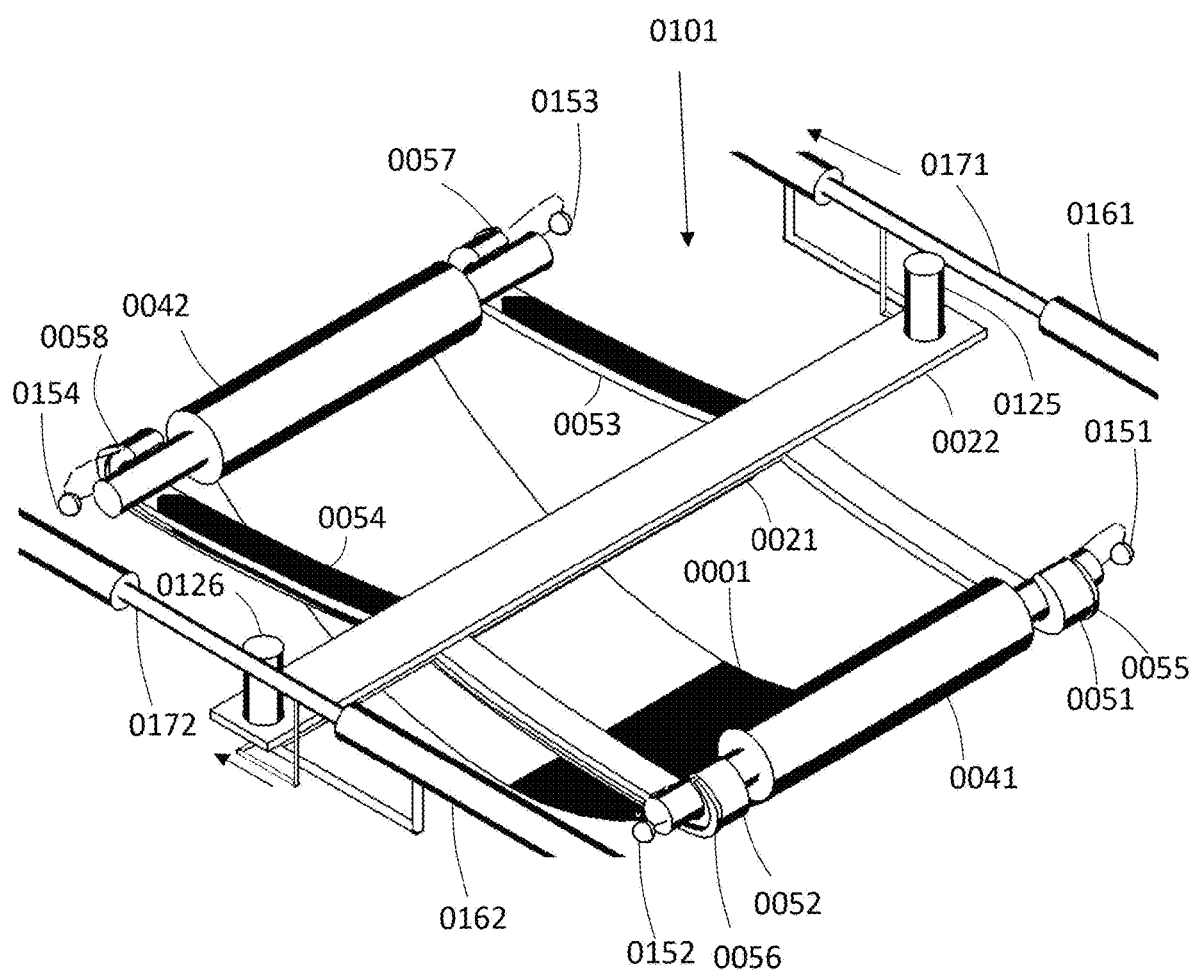
FIG. 5 is an orthographic view of a radiation device with the reflective sheet unfurled, according to an embodiment.
Figure 6:
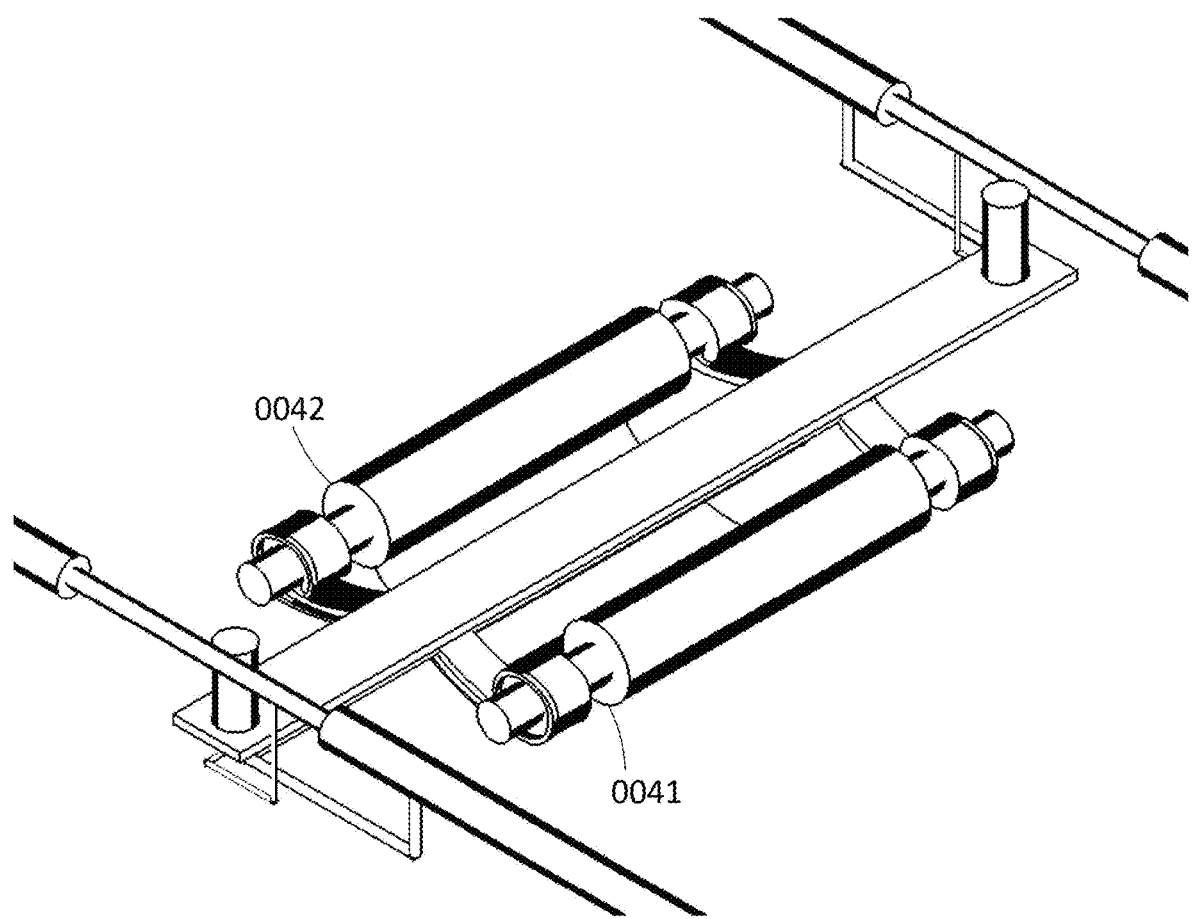
FIG. 6 is an orthographic view of a radiation device with the reflective sheet furled, according to an embodiment.
Figure 7:
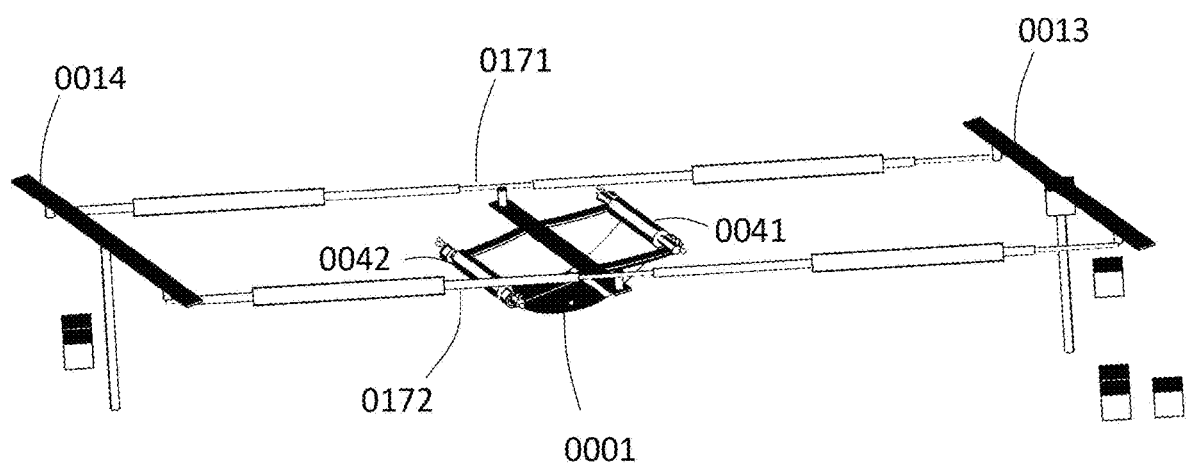
FIG. 7 is an orthographic view of a radiation device in alternate position, according to an embodiment.
Figure 8:
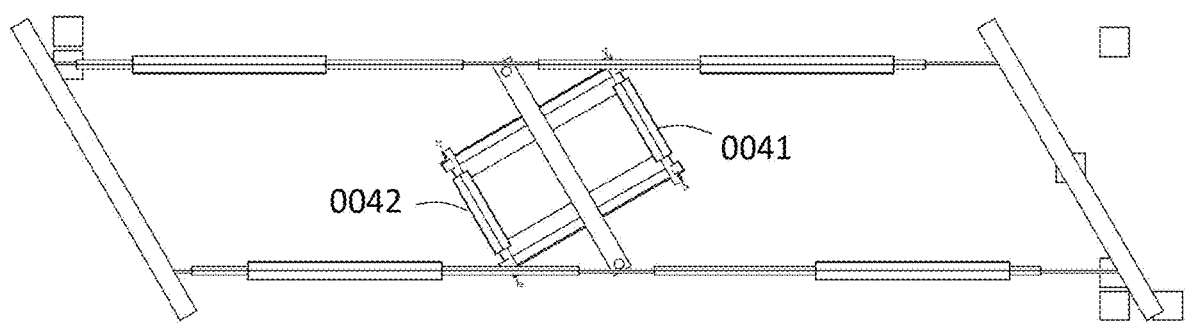
FIG. 8 is a top view of a radiation device in alternate position, according to an embodiment.

FIG. 5 shows radiation device 0100, according to an embodiment, with sheet 0001 unfurled. FIG. 6 shows sheet 0001 furled, according to an embodiment.

According to an embodiment, as shown in FIGS. 1 through 8, post-mounted positioning arm 0013 is located to the east and mounted on post 0011 and rotates about the vertical axis of post 0011. According to an embodiment as shown in FIGS. 1 through 8, post-mounted positioning arm 0014 is located to the west and mounted on post 0012 and rotates about a vertical axis of post 0012. Each of east positioning arm 0013 and west positioning arm 0014 may be linked to north thermal fluid tube 0171 (by a swivel 0121 and a swivel 0122 respectively) and to south thermal fluid tube 0172 (by swivel 0123 and swivel 0124 respectively).

According to an embodiment as shown in FIGS. 1 through 8, tubes 0171 and 0172 festoon between arms 0013 and 0014. Positioning arm 0013 may be rotated due to a linkage to position system 0090, and positioning arm 0014 may be driven in unison with positioning arm 0013 by virtue of common connections to thermal tubing networks 0171 and 0172. Together arms 0013 and 0014 and post 0011 and post 0012 comprise a suspension framework 0010.

According to an embodiment as shown in FIGS. 1 through 8 during radiation concentration, thermal fluid supply system 0070 may circulate thermal fluid 0104 through thermal fluid tubing networks 0171 and 0172 which may be in series with thermal receiver 0021. One possible thermal fluid circulation pattern is shown in FIG. 5, according to an embodiment.

According to an embodiment, as shown in FIGS. 1 through 8, swivel 0125 may be mounted on north thermal fluid tube 0171 and (indirectly) may support one end of thermal receiver 0021 as well as support 0022. According to an embodiment as shown in FIGS. 1 through 8, swivel 0126 may be mounted on south thermal fluid tube 0172 and may support an opposite end of thermal receiver 0021 as well as an opposite end of support 0022. According to an embodiment as shown in FIGS. 1 through 8, swivels 0121, 0122, 0123, 0124 may permit thermal fluid tubing networks 0171 and 0172 to rotate about the vertical axes parallel of connection with arms 0013 and 0014, and with thermal receiver 0021 and support 0022, while remaining attached to same, as may be necessary during operation of positioning system 0090 to achieve (solar) radiation concentration.

According to an embodiment, as shown in FIGS. 1 through 8, actuating fluid supply system 0060 may supply actuating fluid 0103 to actuating fluid tubing networks 0161 and 0162 and thence to inflation coils 0051, 0052, 0053, and 0054 (also referred to as inflatables) and to drums 0041 and 0042.

Figure 2:
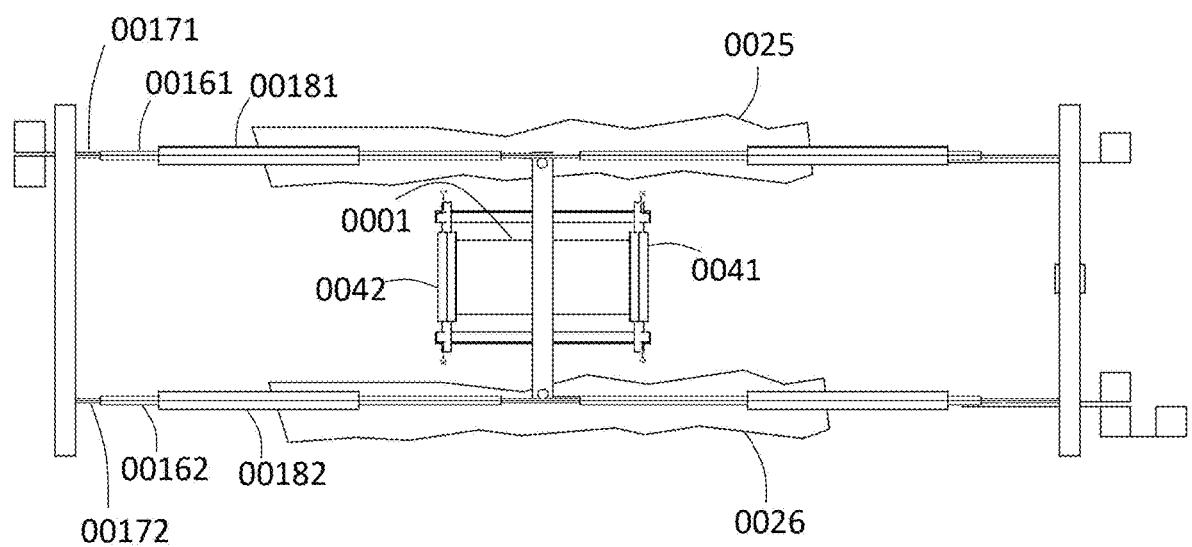
FIG. 2 is a top view of a radiation device, according to an embodiment.
Figure 3:
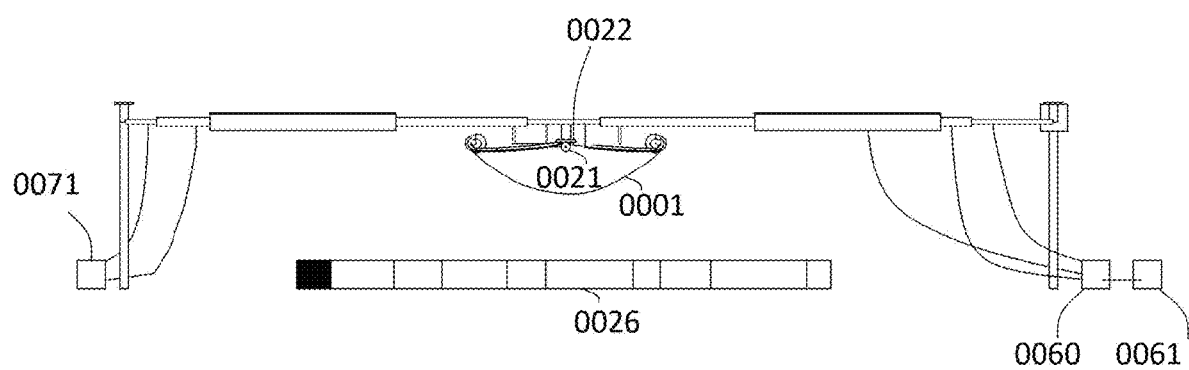
FIG. 3 is a front view of a radiation device, according to an embodiment.
Figure 4:
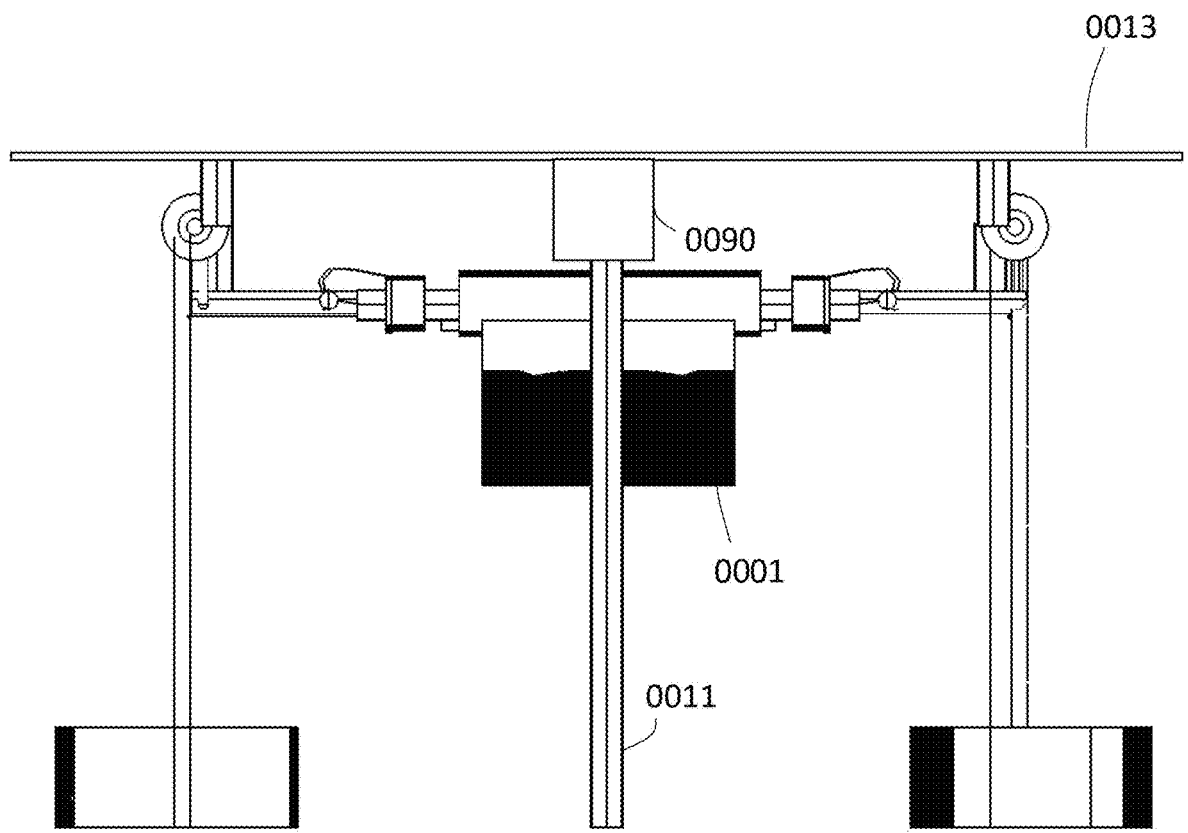
FIG. 4 is a side view of a radiation device, according to an embodiment.

According to an embodiment, as shown in FIG. 2, when irrigation is required, positioning system 0090 may rotate arms 0013 and 0014 to locate irrigation fluid tubing networks 0181 and 0182 above plants 0025 and 0026 below such that irrigation fluid 0105 flows from the irrigation fluid tubing networks 0181 and 0182 downward to the intended plants. According to an embodiment, as shown in FIG. 2, this may involve aligning each irrigation tubing networks 0181 and 0182 on an east-west axis. Plants 0025 and plants 0026 may be arranged in row planting rows, as is common in the art of farming.

According to an embodiment, as shown in FIGS. 1 to 8, support cables 0102 may be comprised of one or more of tubing networks 0161, 0162, 0171, 0172, 0181 and 0182 which may be festooned between positioning arms 0013 and 0014 and in horizontal orientation. In other embodiments, support cables 0102 and tubing networks 0161, 0162, 0171, 0172, 0181 and 0182 may be festooned between positioning arms 0013 and 0014 such that they hang in a catenary shape.

In some embodiments support cables 0102 may be hollow; in some they may not be. In some embodiments, support cables 0102 and one or more of tubing networks 0161, 0162, 0171, 0172, 0181 and 0182 may be integrated; in others they may be separate.

In some embodiments, transfer of fluid (e.g.—actuating fluid 0103 or thermal fluid 0104 or irrigation fluid 0105) between parts that rotate or translate with respect to one another (e.g.—between receiver 0021 and thermal fluid tubing network 0171 and 0172) is achieved by integration with swivels (e.g.—swivels 0121, 0122, 0123, 0124, 0125, and 0126). In some embodiments, transfer of fluid between such parts may be facilitated by flexible tubing, rotary unions, or by gravity transfer.

According to an embodiment, as shown in FIGS. 1 to 8, actuating fluid supply system 0060 and thermal fluid supply system 0070 and irrigation fluid supply system 0080 may communicate fluid to actuating fluid tubing networks 0161 or 0162 and thermal fluid tubing networks 0171 or 0172 and irrigation fluid tubing networks 0181 or 0182 respectively, by flexible tubing. In some other embodiments, such communication may be achieved by swivels or flexible tubing adjoining or integrated with arms 0013 or 0014.

According to an embodiment, as shown in FIG. 10, an arrayed system employing concentrators, thermal receivers, actuating fluid, thermal fluid, irrigation fluid; for solar concentration, energy collection, irrigation, shading of plants, and nighttime blanketing of plants is described. Accordingly, the system may provide cost effective radiation concentration and collector, enhance plant growth, etc.

According to an embodiment as shown in FIG. 10, thermal fluid tubing network 0171 and 0172 is festooned between (post-mounted) arms 0013 and 0014. Receiver 0021 and sheet 0001 and are supported by thermal fluid tubing network 0171 and 0172. According to an embodiment as shown in FIG. 10 receiver 0221 and sheet 0201 and are supported by thermal fluid tubing network 0171 and 0172. A positioning system 0090 rotates positioning arm 0013 about a vertical axis and northwest positioning arm 0014 moves in unison by virtue of interconnection.

According to an embodiment, as shown FIG. 10, sheet 0001 and sheet 0201 are aligned in a single row. In some embodiments, more than two sheets are included in a single row. In some embodiments, multiple rows are implemented (at same elevation or tiered). In some embodiments, two or more rows are ganged together to position receivers 0021 and sheets 0001 of each row in unison. Ganging rows together may be achieved by a variety of methods and materials (e.g.—one or more solid members may connect arms of adjacent rows, or one or more cables may connect arms of adjacent rows).

In some embodiments, thermal fluid tubing network 0171 may supply receiver 0021 (or any array of receivers 0021) with thermal fluid 0104 and thermal fluid tubing network 0172 may return thermal fluid 0104 to the location or vicinity of supply of thermal fluid 0104.

In some embodiments, thermal fluid tubing network 0171 may supply an array of receivers 0021 with thermal fluid 0104 and thermal fluid tubing network 0172 may convey thermal fluid 0104 to a location other than the source of supply of thermal fluid 0104. In such embodiments, the net flow path length or path resistance through each receiver 0021, may be substantially similar, and in some such embodiments, flow may be balanced by virtue thereof.

Figure 11:
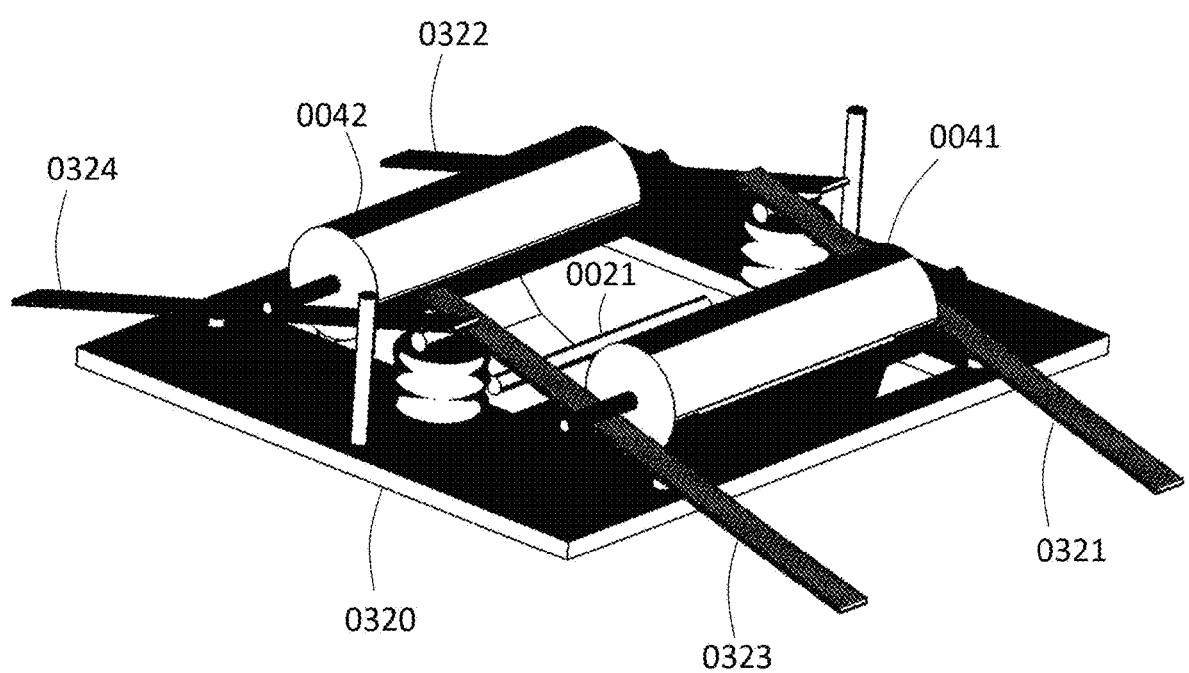
FIG. 11 is an orthographic view of a radiation device, according to an embodiment.
Figure 12:
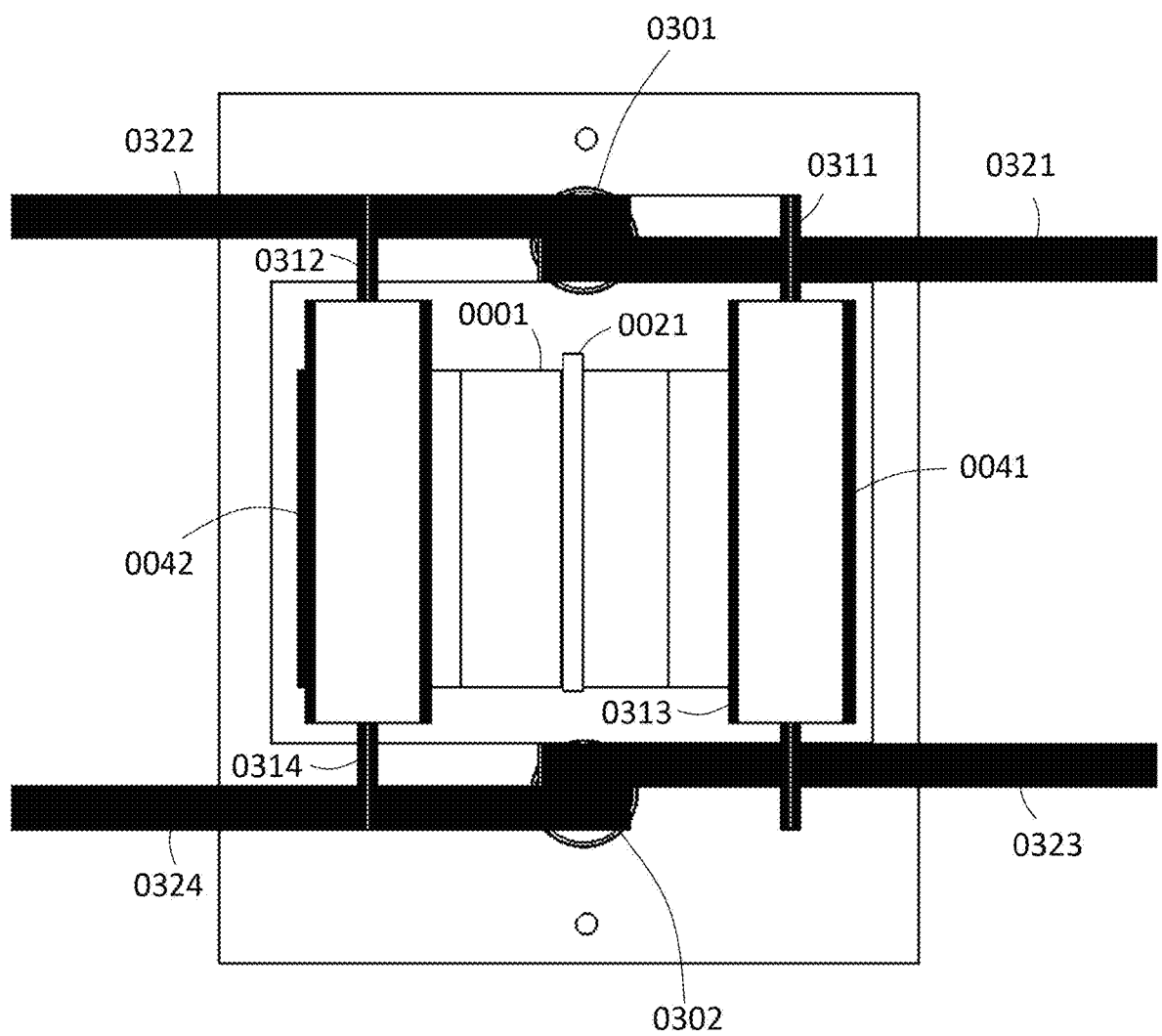
FIG. 12 is a top view of a radiation device, according to an embodiment.
Figure 13:
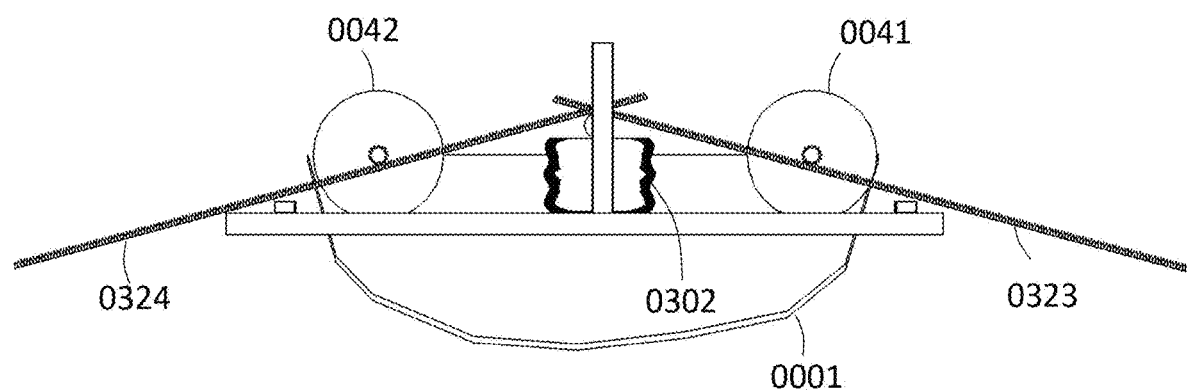
FIG. 13 is a front view of a radiation device, according to an embodiment.

According to an embodiment, as shown in FIGS. 11 through 13, a radiation device 0100 may employ lift-actuated racks, which may be more cost-effective than some other embodiments.

According to an embodiment, as shown in FIGS. 11 through 13, sheet 0001 is furled at one end on an east drum 0041 and at the other end on a west drum 0042. East drum 0041 may be fixed to a northeast gear 0311 on its north end, and to a southeast gear 0313 on its south end. West drum 0042 may be fixed to a northwest gear 0312 on its north end, and to a southwest gear 0314 on its south end.

According to an embodiment, as shown in FIGS. 11 through 13, a frame 0320 supports a northeast pinon rack 0321, a northwest pinon rack 0322, a southeast pinon rack 0323, and a southwest pinon rack 0324. Northeast gear 0311 may engage, rest upon, and traverse northeast pinion rack 0321. Northwest gear May 0312 engage, rest upon, and traverse northwest pinion rack 0322. Southeast gear 0313 may engage, rest upon, and traverse southeast pinion rack 0323. Southwest gear 0314 may engage, rest upon, and traverse southwest pinion rack 0324.

According to an embodiment, as shown in FIGS. 11 to 13, a bellows 0301 (also referred to as an inflatable) may be mounted on frame 0320 and contacts an underside of northeast pinon rack 0321 and northwest pinon rack 0322. Bellows 0302 (also referred to as an inflatable) may be mounted on frame 0320 and contacts an underside of southeast pinon rack 03323 and southwest pinon rack 0324.

According to an embodiment, when no actuating fluid 0103 is fed to bellows 0301 and 0302, bellows 0301 and 0302 may be depressed, and all pinion racks may be tilted such that east drum 0041 and west drum 0042 remain near each other, in a proximal position, and sheet 0001 remains furled. When actuating fluid 0103 is fed to bellows 0301 and 0302, inward (proximal) ends of pinon racks 00321, 00322, 00323 and 00324 may be raised such that east drum 0041 and west drum 0042 traverse (fall) and rotate along a path of their associated pinion racks (by virtue of gear to rack connection) and sheet 0001 is unfurled, which may enable concentration onto receiver 0021.

In some embodiments, a lift-actuated type radiation device 0100 may employ additional inflation components, such as an inflatable drum(s) 0041 or 0042. In some embodiments, a cylindrical solid linear actuator may be used in place of, or in addition to, bellows 0301 and 0302; both types of actuators may be termed as linear actuators. In some embodiments, retaining guides prevent gears 0311, 0312, 0313, and 0314 from disengaging pinion racks 0321, 0322, 0323 and 0324.

In some embodiments, a lift actuated radiation device 0100, may include a frame 0320 that extends within the proximal or central or inboard area only, and the proximal end of each rack 0321, 0322, 0323, and 0324 is supported by and linked to a scissors type mechanism that is supported by or integral with frame 0320, and said mechanism may cause the racks 0321, 0322, 0323, and 0324 (which are cantilever supported by the frame 0320) to lift due to provision of actuating fluid 0103, or to drop by gravity due to the removal thereof, which may cause furling or unfurling respectively.

In some embodiments, bellows 0301 and 0302 may act or travel in a same direction of movement as drums 0041 and 0042, and traversing of drums 0041 and 0042 along pinion racks 0321, 0322, 0323 and 0324 may be achieved when bellows 0301 and 0302 pushes or pull gears 0311, 0312, 0313, and 0314 linked to drums 0041 and 0042, from or towards a central position respectively (rather than by tilt of racks 0321, 0322, 0323 and 0324).

In some embodiments, rather than a rack and pinion, a track and wheel engage by friction to effect the desired rotation and translation of drums 0041 and 0042. Both racks and tracks may be referred to generally as racks.

Figure 14:
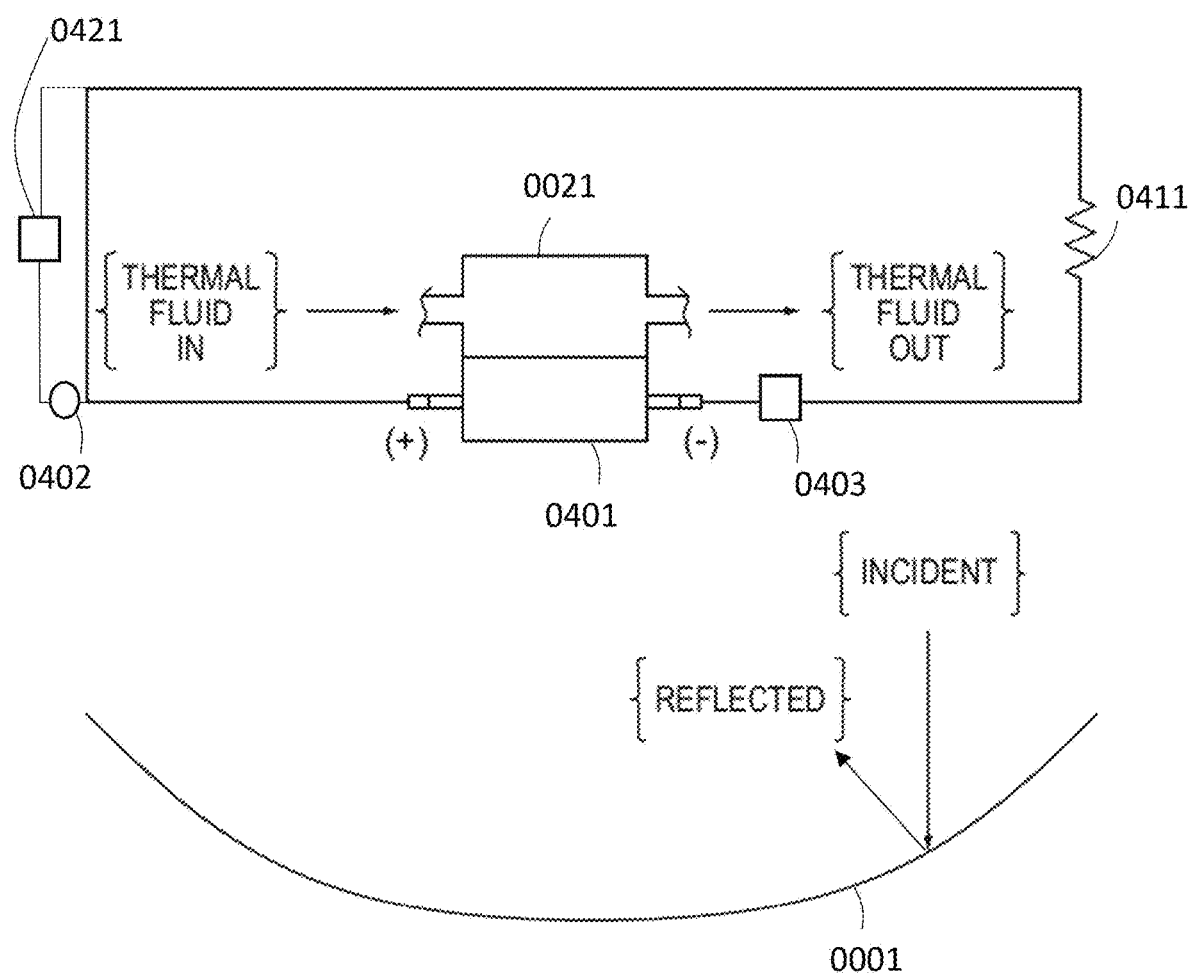
FIG. 14 is a schematic diagram of a radiation device, according to an embodiment.

According to an embodiment, as shown in FIG. 14, a receiver of a system employing a concentrator, thermal receiver, thermal fluid combination light receiving/emitting electrical device, photovoltaic cell, and lighting is described. Accordingly, the system may provide cost effective radiation concentration, electric power generation, lighting, enhance plant growth, etc.

As shown in FIG. 14, combination light receiving and emitting electrical device 0401 may generate a voltage when irradiated and may emit light when a voltage is applied. For example, some devices that exhibit this behaviour are described in various references including in "INVESTIGATING THE PHOTOVOLTAIC BEHAVIOUR OF LIGHT-EMITTING DIODE (LED)", Ogochukwu, Okonkwo, Nweze, IJRRAS 15 (3), June 2013. Combination light receiving and emitting electrical device 0401 may be mounted on an underside of receiver 0021 and may be located at the line focus of sheet 0001.

According to an embodiment as shown in FIG. 14, when irradiated with concentrated light from sheet 0001, combination light receiving and emitting electrical device 0401 generates a voltage and supplies electrical energy to an external load 0411. A portion of the concentrated radiation incident on the combination light receiving and emitting electrical device 0401 may be converted to electrical energy. Heat generated at combination device 0401 may be adsorbed at receiver 0021 and transferred to a thermal fluid 0104.

According to an embodiment, as shown in FIG. 14, when desired (for example, at night, when solar concentration is not occurring), and when sheet 0001 is furled and stowed in a manner that does not obstruct light emission from light receiving and emitting electrical combination device 0401, an external power source 0421 may provide electrical energy to combination light receiving and emitting electrical device 0401, and in response combination light receiving and emitting electrical device 0401 emits light to the area below. By utilizing combination light receiving and emitting electrical device 0401 for two functions, namely radiation energy collection and light emission, financial viability may be enhanced.

According to an embodiment as shown in FIG. 14, a photovoltaic cell 0402 may be suspended from suspension framework 0010 and may be irradiated with concentrated radiation from sheet 0001 to generate electrical power. Photovoltaic cell 0402 may be powered in a circuit with combination receiving and emitting electrical device 0401, or separately, according to an embodiment.

According to an embodiment as shown in FIG. 14, lighting 0403 may be suspended from suspension framework 0010 and may be powered in a circuit with combination receiving and emitting electrical device 0401, by an external power source 0421, or separately, according to an embodiment.

In some embodiments, receiver 0021 may be a combination receiving and emitting electrical device 0401, wherein a thermal energy collection may not be employed. In some embodiments, a solar energy receiving electrical device (e.g.—photovoltaic cell) 0402 may be employed at the line focus of sheet 0001. In some embodiments, lighting 0403 may be employed elsewhere on the radiation device 0100 (e.g.—supported by suspension framework 0010 and disposed to provide light to the area below).

In some embodiments, receiver 0021 is a photovoltaic cell. In some embodiments, support cables 0102 may comprise electrical wiring (e.g.—used to provide electrical connection to combination light receiving and emitting electrical device 0401 or photovoltaic cell 0402). The general principle in effect is that the item receiving concentrated radiation, which may be receiver 0021 or combination light receiving and emitting electrical device 0401 or photovoltaic cell 0402, may be supported by elements used to supply (or withdraw from) it (e.g.—tubing or cables supplying the receiver 0021 or combination light receiving and emitting electrical device 0401 or photovoltaic cell 0402).

In some embodiments, actuators and mechanisms (not shown) may be implemented to stow sheet 0001 in a manner that avoids obstruction of the combination receiving and emitting electrical device 0401 while it provides light or avoids obstruction of the lighting 0403 when it provides light. In some embodiments, sheet 0001 may be located below lighting 0403 and sheet 0001 may include hole(s) or gap(s) that permit light to pass downwards to areas below sheet 0001. In some embodiments, the sheet 0001 is comprised of two halves, on two pairs of drums, between which may remain a gap for light to pass from lights 0403.

In some embodiments receiver 0021 may be a combination receiving and emitting electrical device 0401. In some embodiments, an external power source 0421 (e.g.—battery or mains power or generator) may provide electrical energy to combination receiving and emitting electrical device 0401 for lighting and may receive electrical energy from combination receiving and emitting electrical device 0401 during solar concentration.

Figure 15:
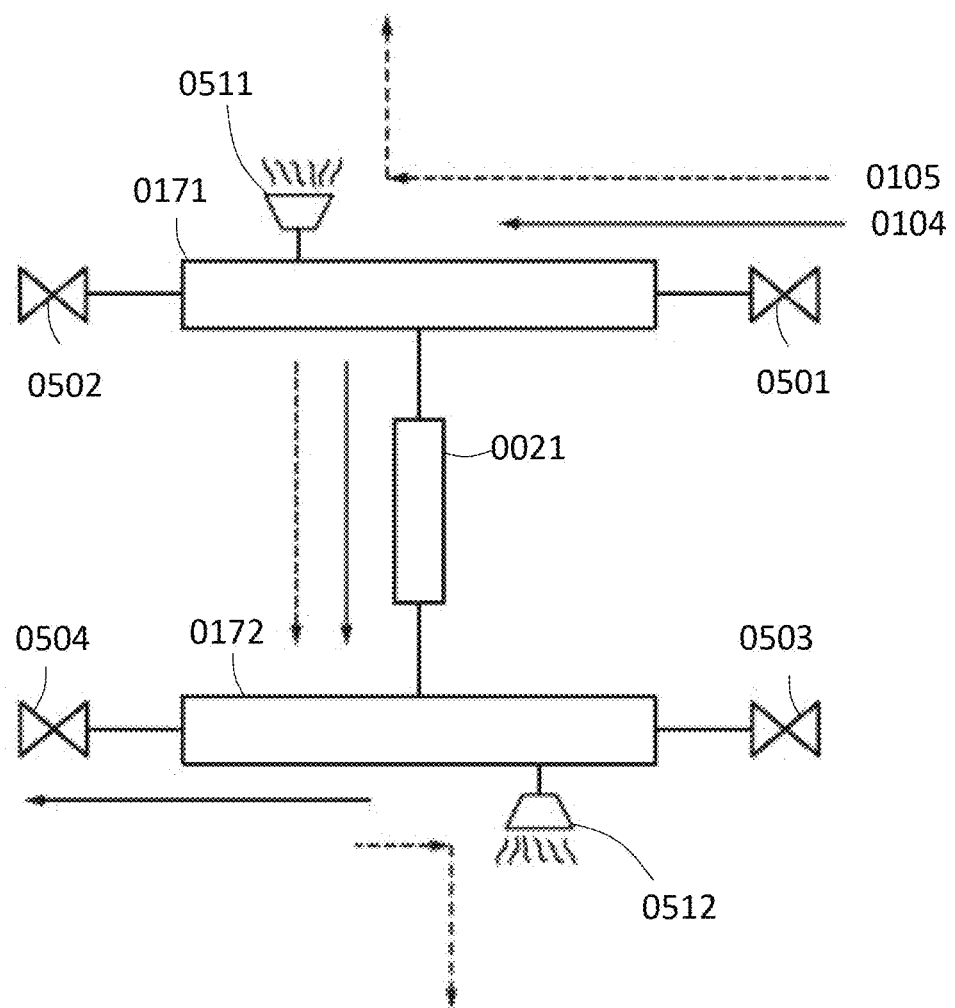
FIG. 15 is a schematic diagram of common supply tubing of a radiation device employing combination thermal-irrigation fluid, according to an embodiment.

According to an embodiment, as shown in FIG. 15, support cables 0102 may commonly transport thermal fluid 0104 and irrigation fluid 0105. Accordingly, the system may provide cost effective radiation concentration and irrigation and enhance plant growth.

According to an embodiment, as shown in FIG. 15, during radiation concentration, support cables 0102 may supply thermal fluid 0104 to receiver 0021. During irrigation, support cables 0102 may supply irrigation fluid 0105 to plants 0025 and 0026. Support cables 0102 may be utilized for both functions, and thereby economic viability is enhanced.

FIG. 15 is a schematic diagram showing the flow of thermal fluid 0104 and irrigation fluid 0105 through support cables 0021, which are comprised of thermal fluid tubing networks 0171 and 0172. Thermal tubing network 0171 may be fed from either end, via a northeast valve 0501 or a northwest valve 0502. Thermal tubing network 0172 may be fed from either end, via a southeast valve 0503 or a southwest valve 0504.

According to an embodiment, as shown in FIG. 15, during thermal concentration, thermal fluid 0104 (e.g.—water) may flow from northeast valve 0501 to north tube 0171, thence to thermal receiver 0021, thence to south tube 0172, thence to southwest valve 0504. A variety of circulation patterns are possible. A possible thermal fluid 0104 circulation pattern is annotated in FIG. 15 with a solid line labeled 0104.

According to an embodiment, as shown in FIG. 15, northern irrigation fitting 0511 (also referred to as an irrigator) may be mounted in thermal fluid network 0171. A southern irrigation fitting 0512 (also referred to as an irrigator) may be mounted in thermal fluid network 0172. According to an embodiment as shown in FIG. 15, when thermal fluid networks 0171 and 0172 may be pressurized to a relatively low pressure, no irrigation fluid 0105 may pass through the irrigation fittings 0511 and 0512. According to an embodiment as shown in FIG. 15, when thermal fluid networks 0171 and 0172 may be pressurized to a relatively higher pressure, irrigation fluid 0105 may pass through fittings 0511 and 0512, irrigating plants 0025 and 0026.

According to an embodiment, as shown in FIG. 15, during irrigation, irrigation fluid 0105 flows from northeast valve 0501 and valves 0502, 0503, 0504 are closed. Pressure in the common tubes 0171 and 0172 may increase until water passes through irrigation fittings 0511 and 0512, and thereby irrigation may be achieved. A possible irrigation fluid 0105 flow circulation pattern is annotated in FIG. 9 with a dashed line labeled 0105.

In some embodiments, rather than utilizing high pressure to initiate irrigation, valves may be used (directly) to select a fluid destination (i.e.—the receiver 0021 or plants 0025 or plants 0026). In some embodiments, such valves may be actuated by inflation fluid 0103 (common to the furling and unfurling mechanism 0101) or thermal fluid 0104 pressure (common to receiver 0021).

In some embodiments, porous soaker tubes (tubes with relatively small holes along their length) are employed as support cables 0102. In some embodiments, minimal or negligible irrigation flow occurs during low pressure operation, and higher irrigation flow occurs at high pressure. In some embodiments support cables 0102 material and wall thickness may be exploited or arranged to serve as insulation that mitigates heat loss during transfer of thermal fluid 0104.

In some embodiments, multiple irrigation fittings (e.g.—sprinklers or drip tubes) similar to irrigation fittings 0511 and 0512 may be employed, to provide a more or less continuous line of drip irrigation. The spacing of irrigation fittings 0511 and 0512 may vary by embodiment. In some embodiments, irrigation fittings 0511 or 0512 may achieve spray irrigation; in some drip irrigation may be achieved.

In some embodiments, during irrigation, irrigation fluid 0105 is imparted to an exterior of support cables 0102, and thence as it flows, water clings to the exterior of support cables 0102 as it traverses support cables 0102, and certain feature(s) of support cables 0102 exterior cause drip irrigation in one or more locations. In some embodiments, a portion of the exterior of support cables 0102 (be it convex, concave, or flat for example) forms part of a channel that guides irrigation water to drip points.

In some embodiments, solar concentration and irrigation may occur simultaneously, others not so.

Figure 16:
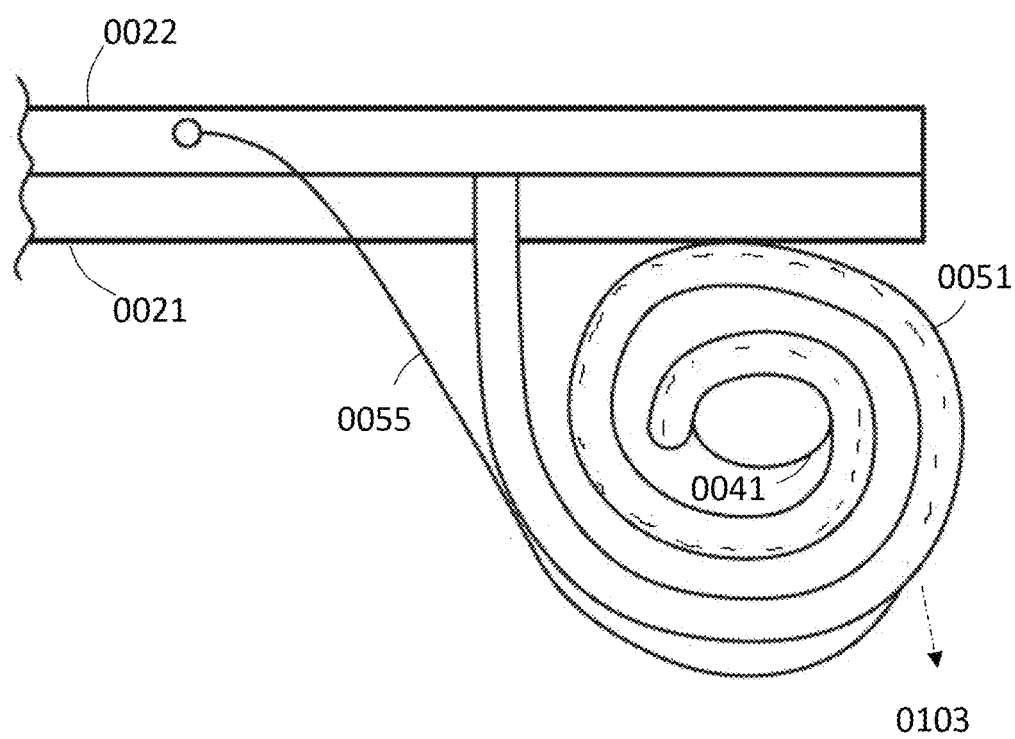
FIG. 16 is a conceptual elevation view of a reflective sheet and inflation coil and coil spring, partially flattened in a storage position, according to an embodiment.

According to an embodiment, as shown in FIG. 16, sheet 0001 may be stored in a flattened, furled position. Accordingly, radiation device 0100 may reduce costs associated with wind damage or damage caused by airborne debris. Further, radiation device 0100 may reduce wind resistance, and reduce transfer of wind loads to suspension framework 0010 and support cables 0102.

According to an embodiment, as shown in FIG. 16, a sheet 0001 may be furled onto drum 0041 that is inflatable and flexible, which, as furling is completed, may be deflated to flatten, or partially flatten the sheet 0001 in a desired manner, and which may permit the sheet 0001 to be stowed compactly. Some advantages of compact stowage may include reduced wind resistance or reduced transfer of wind loads to the related support system.

According to an embodiment, as shown in FIG. 16, components of one half of a radiation device 0100 are shown in side-view during stowage, with inflatable drum partially flattened. In some embodiments, gaps are present between the concentric furls of inflatable coil 0051, 0052, 0052, and 0054. In some embodiments, gaps are not present between the concentric furls of inflatable coil 0051, 0052, 0052, and 0054.

According to an embodiment, as shown in FIG. 16, one edge of coil spring 0055 is attached to support 0022 and another end of coil spring 0055 may be attached to a distal end of inflatable coil 0051. A proximal edge of coil spring 0055 near support 0022 may be flat and may impart a force that reduces an angle or gap between coil spring 0055 and receiver 0021, whereas a distal end of coil spring 0055 may assume a coil shape during furling and may facilitate furling of inflatable coil 0051.

According to an embodiment, as shown in FIG. 16, drum 0041 may be inflatable and not hermetically sealed and controlled (slow) leakage therefrom may be employed during furling. As drum 0041, which may be inflatable, loses actuating fluid 0103 to the ambient atmosphere, drum 0041 may deflate and be flattened due to the force applied by the proximal end of coil spring 0055.

According to an embodiment, as shown in FIG. 16, due to the arrangement and design of inflatable coil 0051, and due to gravity, inflatable coil 0051 is inclined downwards (to a degree) as furling is completed, which permits inflatable drums 0041 and 0042 to come into close proximity to support 0022. Due to the force applied by (the flattened proximal portion) of coil spring 0055, and given that inflatable drum 0041 is not hermetically sealed, after inflatable drum 0041 has come into proximity of support 0022, it may be simultaneously deflated and drawn to a flattened position underneath receiver 0021. The result is that, during stowage, the inflatable drum 0041 and sheet 0001 may be stowed closely to the receiver 0021 than may otherwise be the case.

In some embodiments, the outermost portions of sheet 0001 may comprise materials best suited to stowing and exposure to weather during stowage. Materials may include woven synthetic fibers or plastic sheeting or other materials. In some embodiments, pads (not shown) are attachable to extremities of drums 0041 and 0042, such that pads (not shown) prevent contact between sheet 0001 and other parts of the radiation device. In some embodiments, receiver 0021 is made or allowed to cool before stowage, to mitigate an impact of high temperature exposure on sheet 0001 or other components.

In some embodiments, inflatable coils 0051, 0052, 0053, and 0054 may serve two functions; firstly to rotate and extend the inflatable drum for unfurling, and secondly, to push the inflatable drum away from the stowage position during unfurling (or vice versa).

In some embodiments, the inflatable coil 0051, 0052, 0053, and 0054 may include (or be linked to, or be inflated with) a component or feature that contacts support 0022 during furling such that the proximal portion of coil spring 0055 is forced to open, enabling inflatable drums 0041 and 0042 to reach a more proximal position, for improved stowage.

In some embodiments, radiation device 0100 may include a secondary proximal inflatable chamber (or actuated component) that may remain actuated during furling and may force the proximal portion of the coil spring to remain open. In some such embodiments, such a proximal inflatable chamber may undergo controlled leakage, which may cause the proximal inflatable chamber to leak fully after furling is completed, after which said secondary proximal inflate chamber may deflate, after which the proximal portion of coil spring 0055 may close, completing stowage.

In some embodiments, the rate of removal of actuating fluid 0103 is controlled, so as to promote furling and stowage in a desired manner (e.g.—to ensure proper rotation proper traverse of the inflatable drum 0041 to the most proximal position, before stowage). In some embodiments, mechanical stops or limits limit the range of motion of furling or unfurling components to avoid damage.

In some embodiments, a separate spring or actuator or inflatable chamber or other means is used to apply pressure for stowing or flattening.

Figure 17:
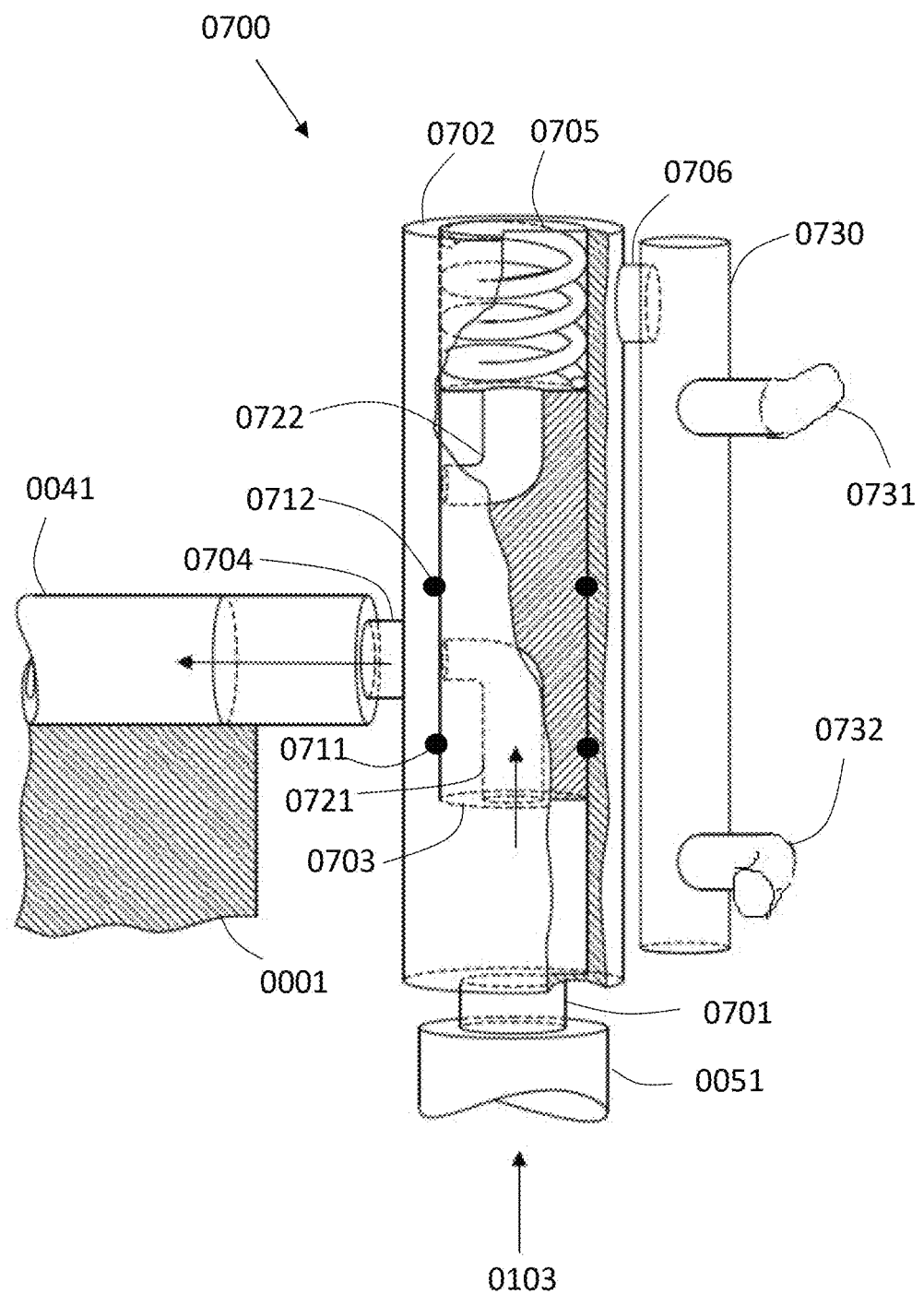
FIG. 17 is a conceptual elevation cut-away view of an element of a radiation device that may facilitate furling of a reflective sheet by discharge of a compressed fluid, shown during pressurization, according to an embodiment.
Figure 18:
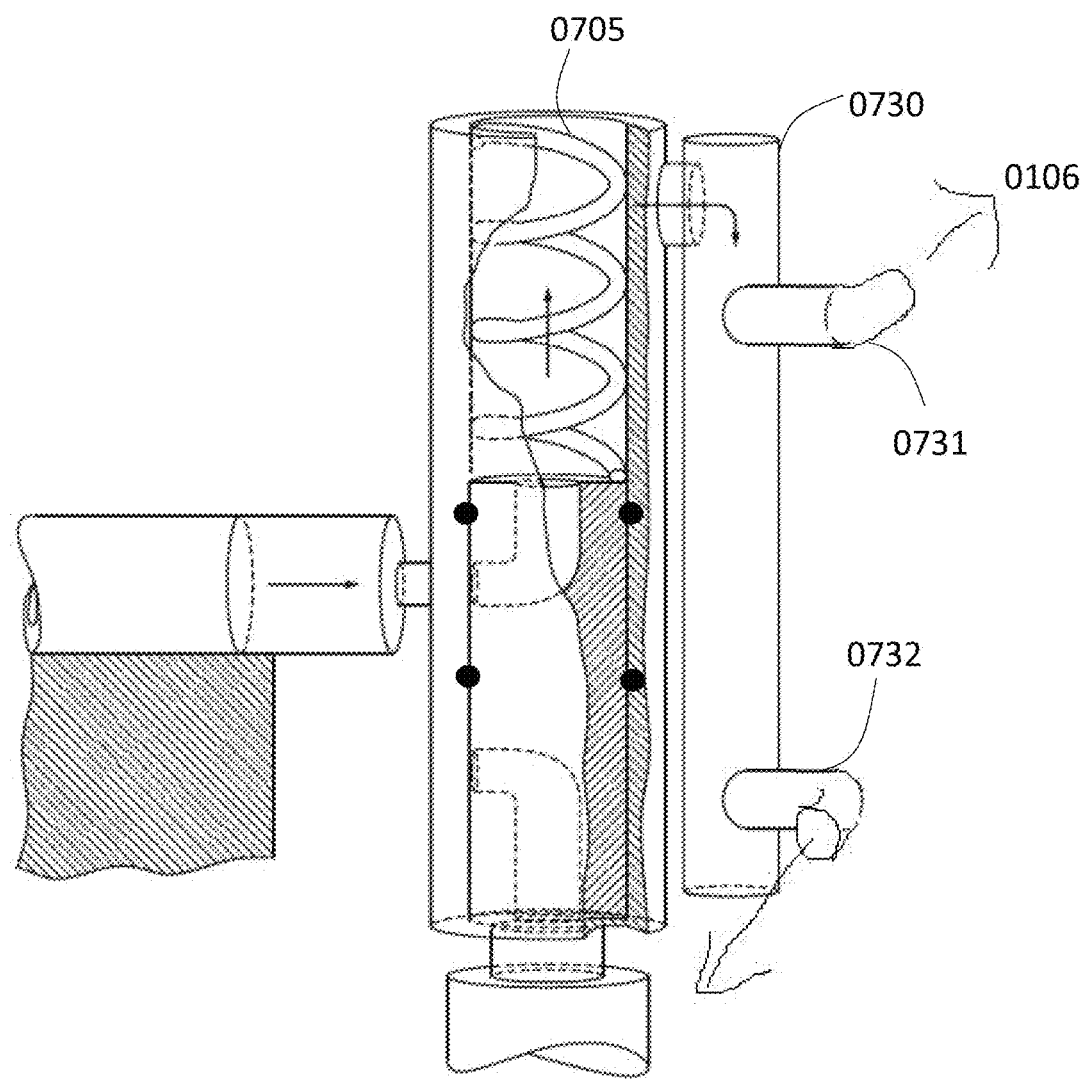
FIG. 18 is a conceptual elevation cut-away view of an element of a radiation device that may facilitate furling of a reflective sheet by discharge of a compressed fluid, shown during depressurization, according to an embodiment.
Figure 19:
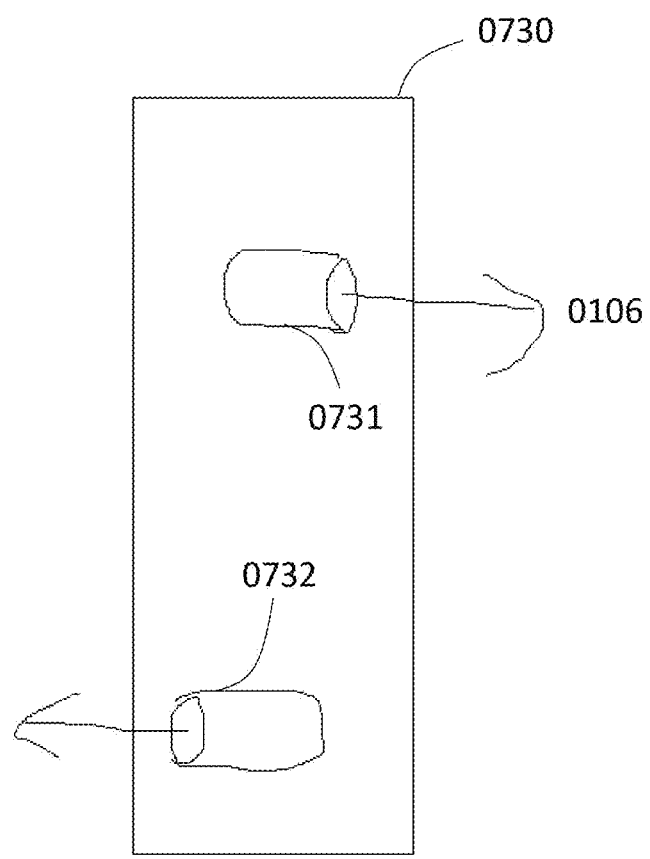
FIG. 19 is a conceptual end view of elements of a radiation device that may facilitate furling of a reflective sheet by discharge of a compressed fluid, shown during depressurization, according to an embodiment.

According to an embodiment, as shown in FIG. 17 through 19, elements of a system that employs an actuating fluid 0103 to facilitate furling are described. Accordingly, the system may provide cost effective radiation concentration, enhance plant growth, etc.

According to an embodiment, as shown in FIGS. 17 through 19, an actuating fluid source 0060 that is controlled by an actuating fluid control system 0061 to adjust actuating fluid 0103 supply may comprise a valve 0700 which may be comprised of: an inlet 0701, a cylinder 0702, a piston 0703, a drum port 0704, a spring 0705, and an outlet 0706. According to an embodiment, cylinder 0702 comprises: two dynamic o-ring seals, a pressure-side seal 0711, and a depressure-side seal 0712. According to an embodiment, piston 0703 comprises two internal flow paths, a pressure-side channel 0721 and a depressure-side channel 0722.

According to an embodiment, as shown in FIG. 17 through 19, an actuating fluid source 0060 that is controlled by an actuating fluid control system 0061 to adjust actuating fluid 0103 supply may comprise a vent chamber 0730, which communicates with outlet 0706. Vent chamber 0730 may include a first vent port 0731 and a second vent port 0732, which may be equidistant from a centreline of drum 0041 and 0042.

According to an embodiment, as shown in FIG. 17 through 19, due to an orientation of vent ports 0731 and 0732, during venting of vent fluid 0106 (as will be described below), vented vent fluid 0106 (e.g.—air) exiting vent ports 0731 and 0732 may be caused to travel in a direction that is clockwise about the centreline of drum 0041 and 0042 (as viewed from the drum end), which is opposite a rotation undergone by drum 0041 and 0042 during furling.

According to an embodiment, as shown in FIG. 17, sheet 0001 is unfurled due to an addition of actuating fluid 0103 (e.g.—air). Actuating fluid fed to inflatable coil 0051 may it to substantially straighten, which may cause unfurling due to translation and rotation of drum 0041. According to an embodiment as shown in FIG. 17, actuating fluid 0103 passes through coil 0051 to inlet 0701, and may apply force to piston 0703, which may cause it to displace by overcoming and compressing spring 0705. Due to motion of piston 0703, pressure-side channel 0721 may move (in relation to pressure-side seal 0711) to a position that allows actuating fluid 0103 to pass from inlet 0701, through pressure-side channel 0721, through drum port 0704, and into the interior of drum 0041, where air accumulates. Arrows in FIG. 17 labeled 0103 show the flow path of actuating fluid 0103 during unfurling.

According to an embodiment, as shown in FIG. 18, sheet 0001 may be furled due to removal of actuating fluid 0103. Due to a lack of actuating fluid pressure, piston 0703 may be displaced as spring 0705 expands. Due to the motion of piston 0703, depressure-side channel 0722 may be moved (in relation to depressure-side seal 0712) to a position that allows stored actuating fluid 0103 to pass from drum 0041, through depressure-side channel 0722, through outlet 0706. According to an embodiment, as shown in FIG. 18, this may allow actuating fluid 0103 to travel into vent chamber 0730 and thence to vent ports 0731 and 0732. According to an embodiment, as shown in FIG. 18, vented actuating air 0103, which in such an instance of venting may be referred to as vent fluid 0106, is ejected in a clockwise direction about drum 0041 and is met with a reaction force that causes drum 0041 to rotate in a counter-clockwise direction, thereby furling sheet 0001. Arrows in FIG. 18 labeled 0103 show the flow path of vent fluid 0106 during furling.

According to an embodiment, FIG. 19 shows an end view of a controller to adjust actuating fluid 0103 supply, which shows the flow of air during furling. Annotated in FIG. 19 labeled 0106 is the flow path of vent fluid 0106. As it exits vent chamber 0730, vent fluid 0106 is redirected by the vent ports 0731 and 0732 to travel in the desired manner.

In some embodiments, a variety of valve arrangements for venting may be employed, some including a piston mounted dynamic seal, others a cylinder mounted dynamic seal, etc. In some embodiments, vent fluid 0106 may be used in combination with a coil spring 0055 to achieve furling. In some embodiments, a bladder or spring-loaded piston may be energized during pressurization, and upon depressurization may provide vent fluid 0106 or energy to assist furling. In some embodiments, the vent chamber vent ports are relatively distant from the drum centreline to enhance torque about the drum centreline.

In some embodiments, a collapsible tube (e.g.—accordion type, etc.) may cause the drums 0041 to traverse between distal and proximal positions. In such embodiments, the traversing of drums 0041 may be achieved by pressurization or depressurization of the collapsible tube. In some embodiments, the collapsible tube is used in combination with other tools for rotating the drums 0041.

In some embodiments, a furling and unfurling mechanism 0101 may comprise controlled release of actuating fluid 0103, use of a coil spring 0055, use of a motor, use of a linear actuator, gravity, or a combination thereof.

In some embodiments, a spring-loaded fan may rotate during furling to impart wind resistance that generates a reaction force for furling or unfurling. In some such embodiments, the spring of the spring loaded fan may be initially energized by actuating fluid 0103 (e.g.—air used for furling) prior to de-energization and fan-actuation for furling. In some embodiments, a motorized fan may facilitate furling.

Figure 20:
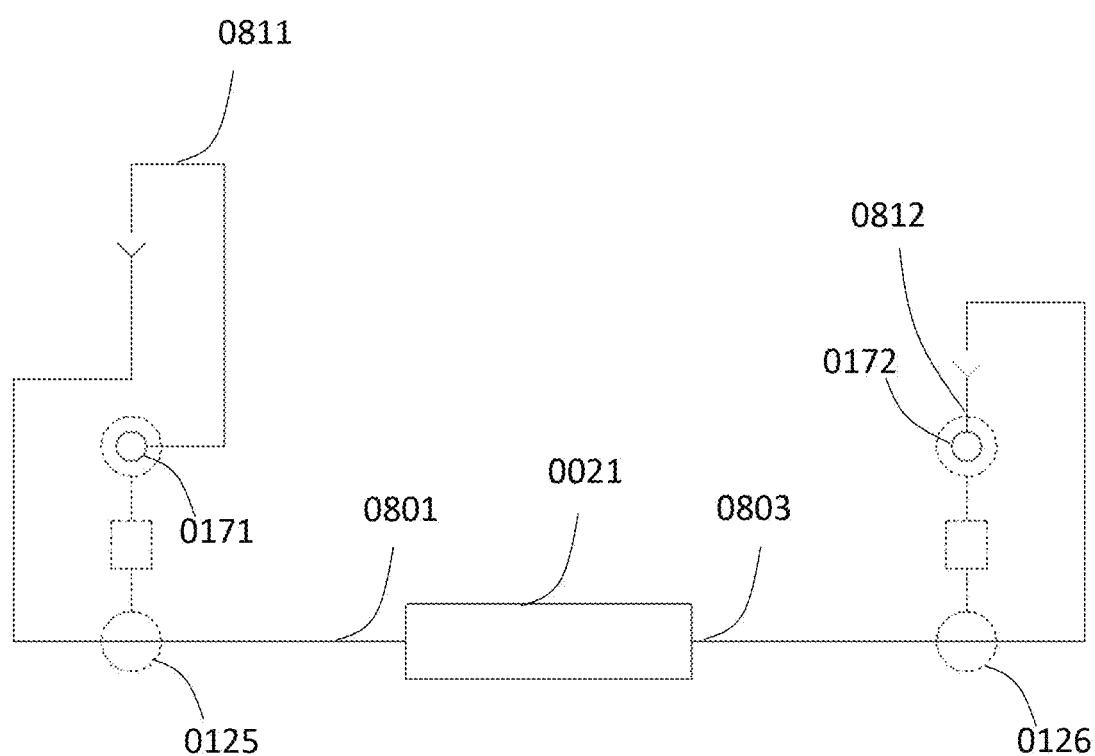
FIG. 20 is a hydraulic schematic of a gravity type thermal fluid circulation system of a radiation device, according to an embodiment.

According to an embodiment, as shown in FIG. 20, a radiation device 0100 that employs gravity type thermal fluid circulation is described. According to an embodiment, gravity type thermal fluid circulation achieves transfer of thermal fluid (between adjoining parts undergoing relative motion) without flexible tubing or swivels or rotary unions. A radiation device 0100 employing gravity type thermal fluid circulation may reduce costs and increase energy efficiency of radiation concentration.

According to an embodiment, as shown in FIG. 20, thermal fluid 0104 passes from receiver tube 0801 to receiver 0021 and thence to receiver tube 0802. Receiver tubes 0801 and 0802 may communicate (by non-swivel transfer) with thermal fluid tubing networks 0171 and 0172 respectively (via supply tube 0811 and return tube 0812 respectively).

According to an embodiment, as shown in FIG. 20, receiver 0021 may be supported from thermal fluid tubing networks 0171 and 0172 indirectly by swivels 0125 and 0126, that support receiver tubes 0801 and 0802 respectively, which are joined to receiver 0021. In some similar embodiments, swivels 0125 and 0126 may be relatively simplified and inexpensive, and similar to "fishing type" swivels (barrel swivels, ball swivels, etc.).

According to an embodiment, as shown in FIG. 20, supply tube 0811 (which communicates with thermal fluid tubing network 0171) may transfer thermal fluid 0104 to an opening in receiver tube 0801. Due to the discharge of supply tube 0811 and the inlet of receiver tube 0801 being vertically in alignment with the connection between thermal fluid tubing network 0171 and swivel 0125 (and axis of rotation thereof), supply tube 0811 and receiver tube 0801 may remain aligned for fluid transfer during the motion of the receiver 0021.

According to an embodiment, as shown in FIG. 20, return tube 0812 (which communicates with thermal fluid tubing network 0172) may receive thermal fluid 0104 (at the opening of return tube 0812) from receiver tube 0802. Due to the discharge of receiver tube 0802 and the inlet of return tube 0812 being vertically in alignment with the connection between thermal fluid tubing network 0172 and swivel 0126 (and axis of rotation thereof), receiver tube 0802 and return tube 0812 may remain aligned for fluid transfer during the rotation of receiver 0021.

According to an embodiment, as shown in FIG. 20, radiation device 0100 may employ a common source for thermal fluid 0104 and irrigation fluid 0105, namely support cables 0102 which comprise thermal fluid networks 0171 and 0172. When downstream discharge ports of thermal fluid networks 0172 are closed (e.g.—by a valve), the fluid supplied (in this context irrigation fluid 0105) may overflow the return tube 0812 and thence to plants 0025 below (i.e.—for irrigation).

Figure 21:
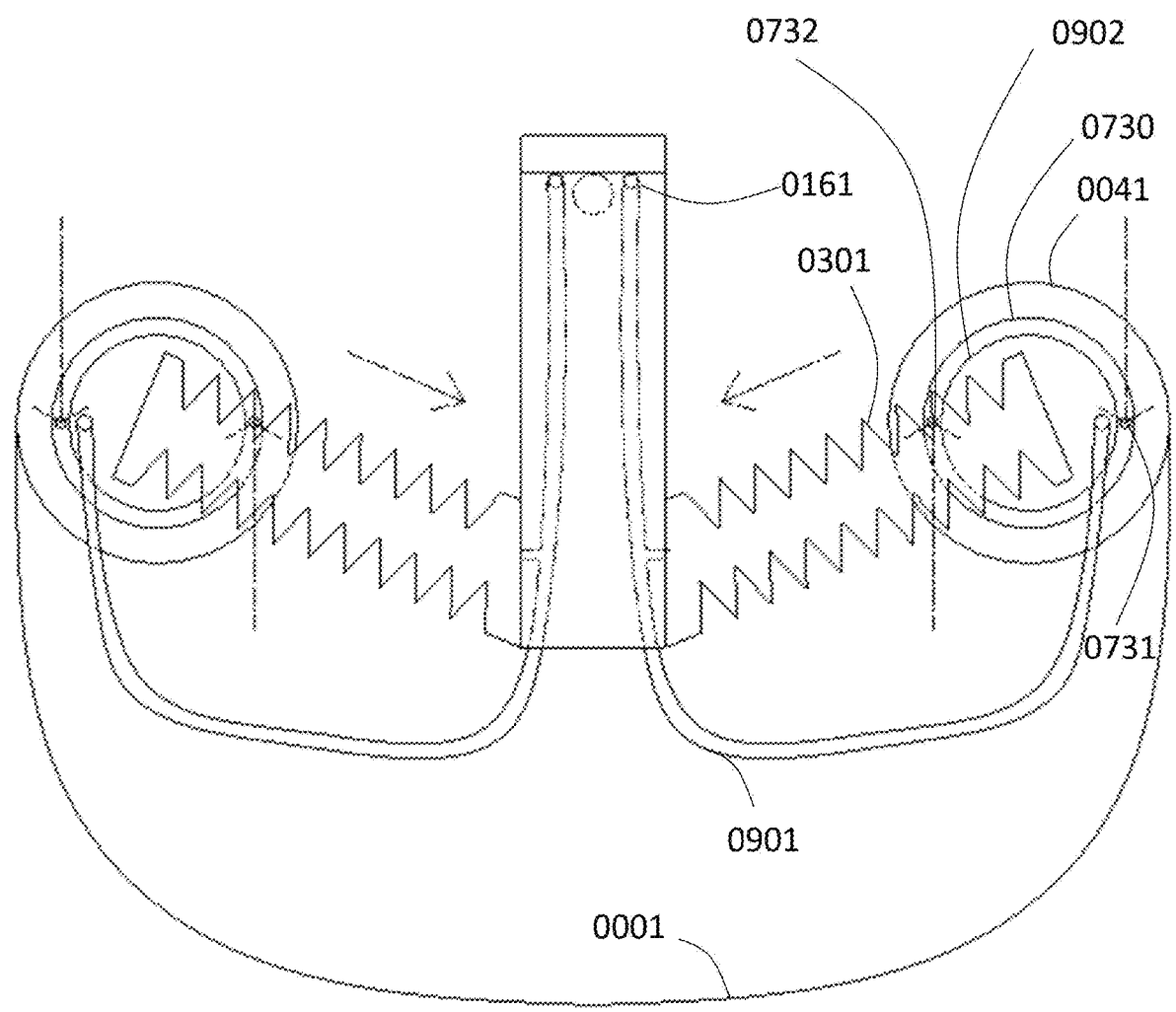
FIG. 21 is a conceptual elevation view of elements of a radiation device, shown during furling, according to an embodiment.
Figure 22:
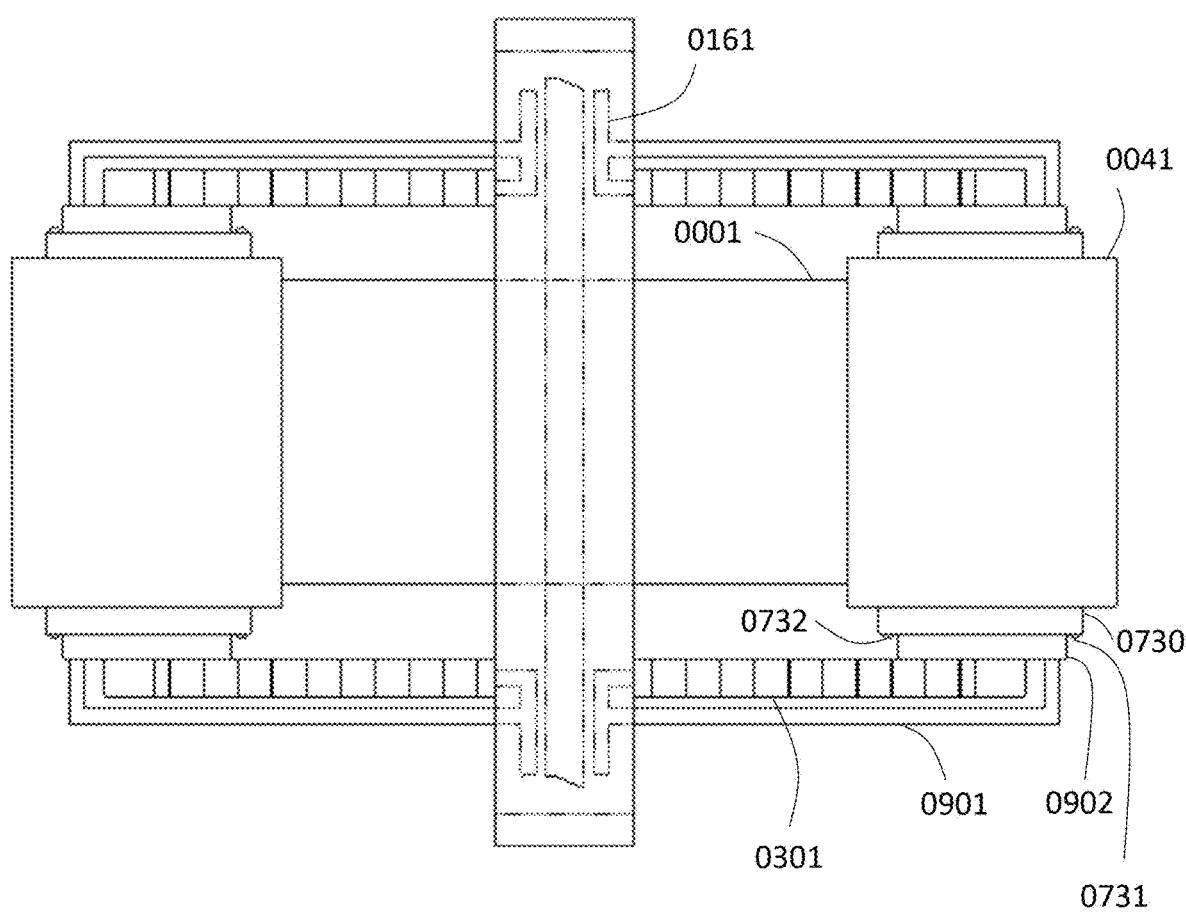
FIG. 22 is a conceptual plan view of elements of a radiation device, shown during furling, according to an embodiment.

According to an embodiment, as shown in FIG. 21 through 22, elements of a system with bellows that facilitates furling by applying a vacuum are described. Accordingly, the system may provide cost effective radiation concentration or enhance plant growth.

FIG. 21 shows a conceptual elevation view, FIG. 22 a conceptual plan view. Each figure shows the system during furling. According to an embodiment, components to the right of FIGS. 21 and 22 will be described; the components to the left of FIGS. 21 and 22 may operate in a similar manner.

Actuating fluid tubing network 0161 may be used to apply vacuum to bellows 0301 and tube 0901 and thence to vacuum cylinder 0902 and thence to vent chamber 0730. Vent chamber 0730 may be rotatably connected to vacuum cylinder 0902 (i.e.—connected in such a way that they may rotate relative to one another). Vent chamber 0730 may be connected to drum 0041 and they rotate in unison. Drum 0041 may be connected to sheet 0001.

When vacuum is applied via actuating fluid tubing network 0161, bellows 0301 collapses and drum 0041 is free to move. When vacuum is applied via actuating fluid tubing network 0161, and thence to tube 0901 and thence to vacuum cylinder 0902 and thence to vent chamber 0730, vent fluid 0106 is drawn into vent chamber 0730 via vent ports 0731 and 0732 from the ambient atmosphere, in the direction(s) indicated. A reaction-force to the flowing vent fluid 0106 causes drum 0041 to rotate and sheet 0001 furls thereupon.

According to an embodiment, as shown in FIGS. 21 and 22, during furling, tube 0901 may loosely coil or furl. Tube 0901 may be flexible enough to loosely coil while remaining sufficiently open to convey vacuum or partial vacuum. In some embodiments, the degree of vacuum may be selected in consideration of the force required for rotating the drum as well as the collapse pressure limit for the tube 0901.

According to an embodiment, as shown in FIGS. 21 and 22, actuating fluid tubing network 0161 may also be used to apply actuating fluid 0103 to the bellows 0301 and (indirectly) to vent chamber 0730 and to actuate unfurling. In some embodiments, common use of actuating fluid tubing network 0161 for the two purposes (pressurization to unfurl, vacuum to furl) may promote economic viability. In some embodiments, a common compressor/vacuum pump system (which may comprise related valves) of actuating fluid supply system 0060 (in connection with network 0161) may operate in "forward" or "reverse" mode to variously provide pressure or vacuum (for unfurling and furling respectively); which may promote economic viability. In some embodiments, network tubing, gas compression, rarefaction systems, may be integrated; in others they may be separate.

In some embodiments where actuating fluid tubing network 0161 may supply (pressure or) vacuum in common to bellows 0301 and tube 0901, selective constriction in certain areas of network 0161 may be applied to effect bellows 0301 depressurization at a reduced rate (relative to depressurization of tube 0901), for example to avoid droop of drum 0041 thereof during the furling process or for other reasons.

In some embodiments, check valves may be installed to allow compressed air to be supplied to the bellows 0301 only (and not tube 0901) during unfurling, and for vacuum to be applied to bellows 0301 and tube 0901 commonly during furling.

Figure 23:
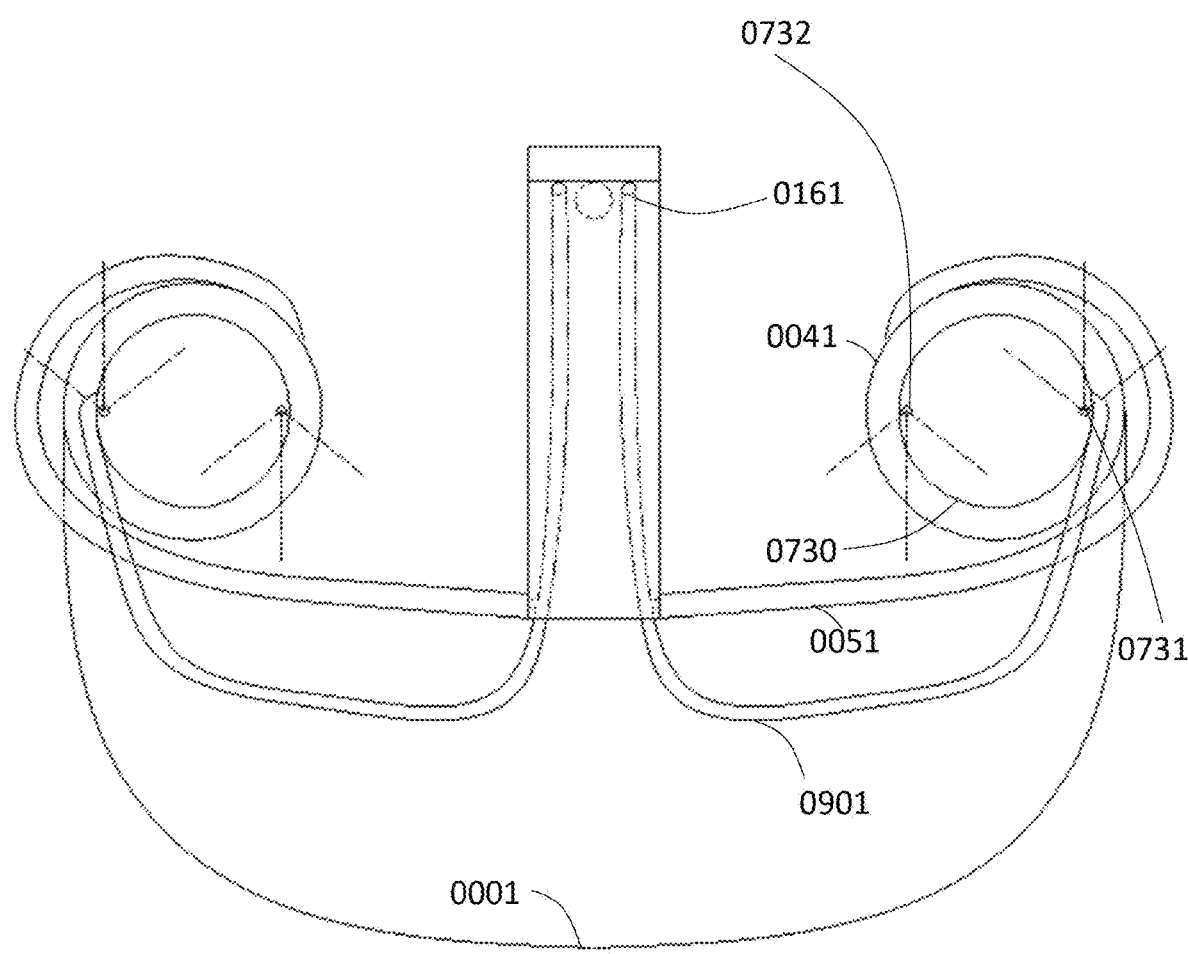
FIG. 23 is a conceptual elevation view of elements of a radiation device, shown during furling, according to an embodiment.
Figure 24:
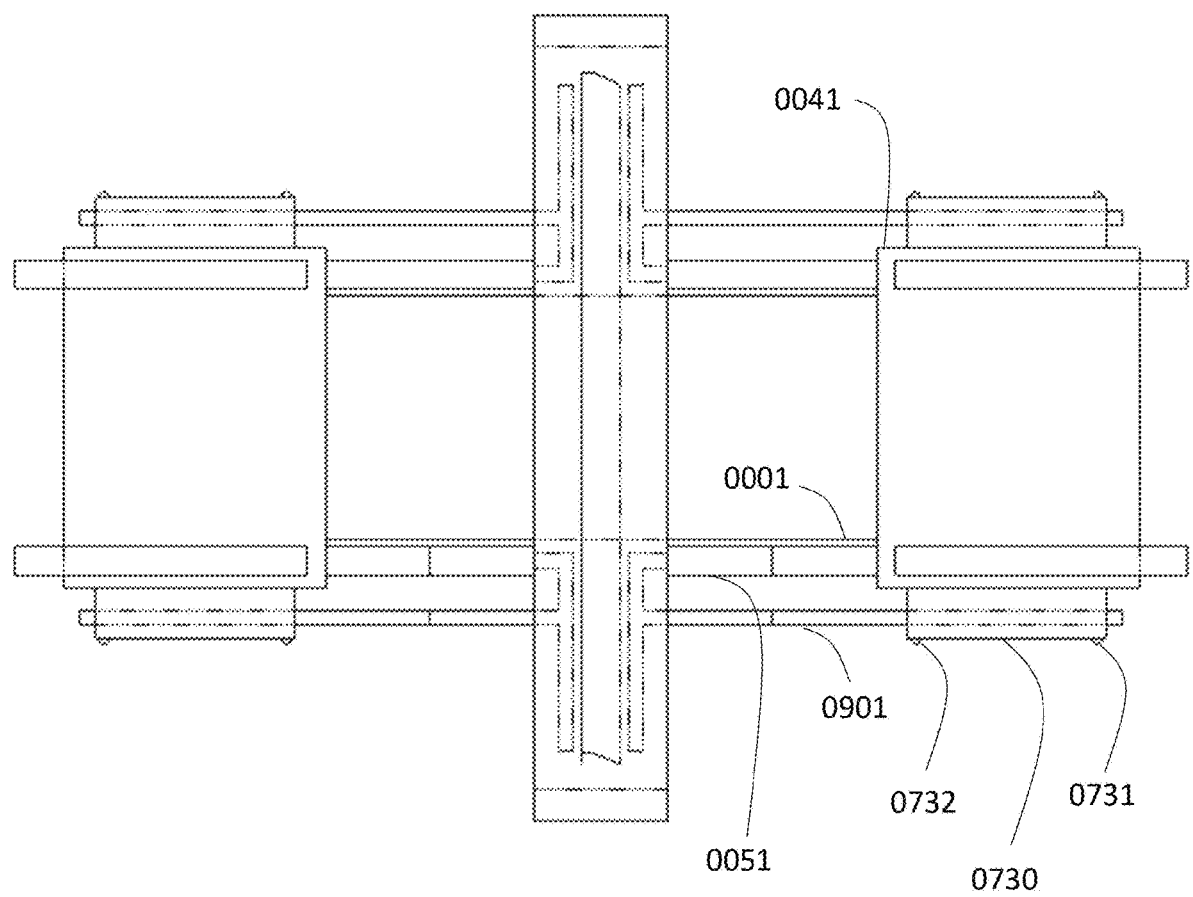
FIG. 24 is a conceptual plan view of elements of a radiation device, shown during furling, according to an embodiment.

According to an embodiment, as shown in FIG. 23 through 24, elements of a system with an inflatable coil that facilitates furling by applying a vacuum, are described. Accordingly, the system may provide cost effective radiation concentration, enhance plant growth, etc.

FIG. 23 shows a conceptual elevation view, FIG. 24 a conceptual plan view. Each figure shows the system during furling. Similar to the bellows-type embodiment as described in FIGS. 21 and 22, an inflation coil type embodiment is described in FIGS. 23 and 24.

According to an embodiment, as shown in FIG. 23 through 24, actuating fluid tubing network 0161 is used to apply vacuum to inflatable coil 0051 and tube 0901 and thence to vent chamber 0730. Vent chamber 0730 is connected to drum 0041 and they rotate in unison. Drum 0041 is connected to sheet 0001.

According to an embodiment, as shown in FIG. 23 through 24, when vacuum is applied via actuating fluid tubing network 0161, inflatable coil 0051 may collapse and drum 0041 may become free to move. When vacuum is applied via actuating fluid tubing network 0161 to vent chamber 0730 via tube 0901, vent fluid 0106 may be drawn into vent chamber 0730 from the ambient atmosphere through vent ports 0731 and 0732, in the direction(s) indicated. A reaction-force to the flowing vent fluid 0106 may cause drum 0041 to rotate and sheet 0001 furls thereupon.

According to an embodiment, as shown in FIG. 23 through 24, during furling, tube 0901 loosely coils (onto vent chamber 0730). Similar to an embodiment as shown in FIGS. 21 and 22, according to an embodiment as shown in FIGS. 23 and 24, pressurized fluid and vacuum tubing may be applied alternatively to tube 0901 for two purposes (pressurization and unfurling or vacuum and furling).

In some embodiments, check valves may be installed to allow actuating fluid 0103 to be supplied to the inflatable coil 0051 only (and not vacuum tube 0901) during unfurling (for example, to avoid loss of actuating fluid 0103 via vacuum tube 0901 during unfurling), and for vacuum to be applied to inflatable coil 0051 and vacuum tube 0901 during furling.

In some embodiments, vacuum is applied from a vacuum system of actuating fluid supply system 0060 to inflatable coil 0051 or vacuum tube 0901 during furling and in some such embodiments, said vacuum system may also be employed to apply vacuum to, for example, annular tubing surrounding thermal fluid network tubing 0171 for insulative effect, or for example, to a clear pane integrated with receiver 0021 for insulative effect.

According to an embodiment, as shown in FIG. 23 through 24, a pilot valve (not shown) may be modulated by the pilot pressure of thermal fluid 0104 such that when thermal fluid 0104 is pressurized the pilot valve (not shown) will not admit vacuum to be applied from the actuating fluid network tubing 0161 to inflatable coil 0051 or vacuum tube 0901.

According to an embodiment, as shown in FIG. 23 through 24, during radiation concentration, and while thermal fluid 0104 is pressurized and acting upon pilot valve (not shown), vacuum may be applied to actuating fluid network tubing 0161 without causing furling due to the action of the pilot valve (not shown), which would be "closed" due to the effect the pilot pressure of thermal fluid 0104. In similar embodiments, actuating fluid network tubing 0161 may form an annulus around thermal fluid network tubing 0171 for a vacuum insulation effect, and may apply vacuum to a clear pane integrated with receiver 0021 for a vacuum insulation effect, and thereby heat loss from thermal fluid 0104 (which is of concern during radiation concentration) is mitigated.

Figure 25:
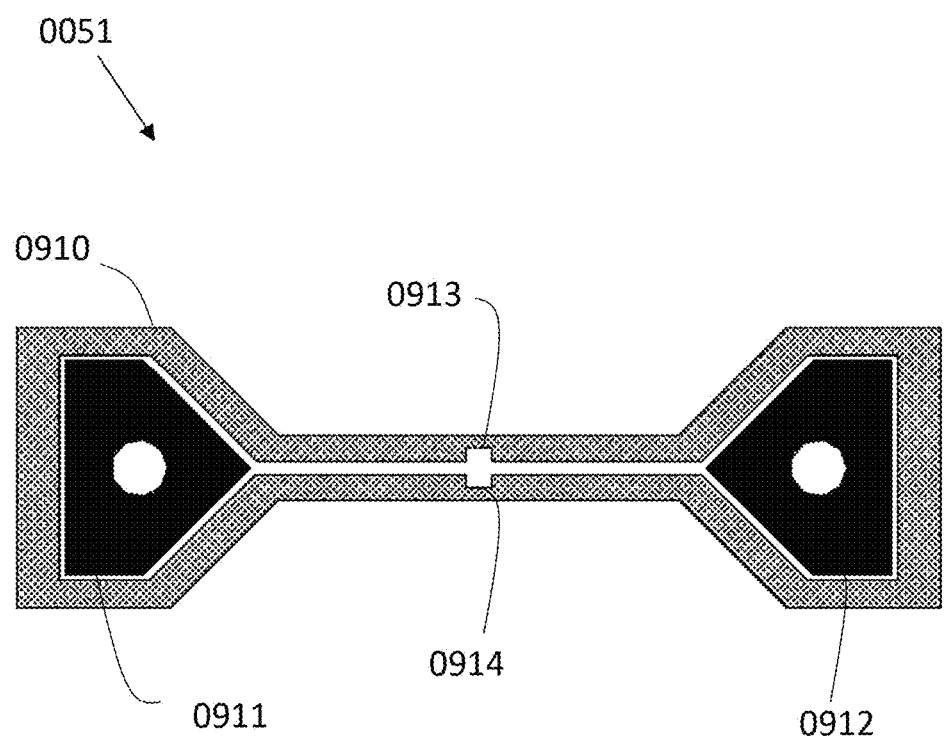
FIG. 25 is a conceptual cross section of an inflatable coil of a radiation device, shown during furling, according to an embodiment.

According to an embodiment, as shown in FIG. 25, an inflatable coil of a system that facilitates furling by applying a vacuum is described. Accordingly, such an inflatable coil may enhance cost effective radiation concentration, enhance plant growth, etc.

FIG. 25 shows the inflatable coil 0051 during furling,

In some embodiments, such as is described in FIG. 24, a tube 0901 that is separate from inflatable coil 0051 is used to apply vacuum for reaction-force type furling. In other embodiments, such as according to an embodiment as shown in FIG. 25, a channel for applying vacuum for reaction-force type furling is integrated into the inflation coil 0051.

According to an embodiment, as shown in FIG. 25, inflatable coil 0051 includes an envelope 0910 within which are left insert 0911 and right insert 0912. Envelope 0910 comprises notch 0913 and notch 0914. When a vacuum is applied to the interior of inflatable coil 0051 its flexible envelope 0910 may collapse, as shown, upon inserts 0911 and 0912. Each of inserts 0911 and 0912 may deform into the compacted spiral shape of deflated coil 0051; which may allow the coil 0051 to furl, and for adjacent wraps of coil 0051 to furl upon one another.

Each of inserts 0911 and 0912 may include a hollow channel which may remain at least partially open during the application of vacuum and therefore which may retain the ability to convey fluid as vacuum is applied, during furling.

Envelope 0910 includes notches 0913 and 0914, which remain at least partially open during the application of vacuum and therefore retain the ability to convey fluid as vacuum is applied, during furling.

In some embodiments, the inflatable coil 0051 may include none or more inserts 0911 together with none or more notches 0913. In some embodiments notch 0913 may be of a square profile, in some rectangular, in some triangular, in some open-polygonal, in some semi-circular, in some undulating, etc. In some embodiments, opposing faces of the inflatable coil 0051 may be notched, in some only one face may be notched. In some embodiments, notches may span the width of the inflatable coil face, in others not.

In some embodiments, insert 0911 is made of foam, in others insert 0911 is of a different collapsible material. In some embodiments, insert 0911 within the inflatable coil 0051 may provide a path for vacuum at all times. In other embodiments, insert 0911 may provide a path for vacuum during furling, and may become substantially compressed thereafter, with reduced ability to convey vacuum, and increased ability for compact stowage.

General comments about various embodiments of the invention are given below.

In some embodiments, fluid is used to actuate furling, in some to actuate unfurling; in some embodiments by pressurizing a fluid, in some embodiments by reducing the pressure of a fluid, in some embodiments by applying a vacuum to a fluid; in some cases with air, in some cases with water, in some cases with other materials. Collectively, such fluids may be referred to as actuating fluids.

In some embodiments an inflatable coil 0051 may actuate furling or unfurling. In some embodiments an inflatable bellows 0301 may actuate furling or unfurling. Other shapes may be used to actuate furling (e.g.—collapsible tube similar to a bellows, balloon, etc.). In some embodiments, a linear actuator that expands or contracts due to the provision or removal of actuating fluid, may actuate furling or unfurling. Collectively, such inflatable items for actuating furling may be referred to as inflatables.

A drum 0041 that may be connected directly to an inflatable (e.g.—to an inflatable coil 0051) or may be indirectly moved or rotated by an inflatable (e.g.—by a bellows 0301) can be said to be linked to the inflatable.

In some embodiments, a part is supported directly by cables 0102 (e.g.—support, housing, receiver, coils, etc.). In some embodiments a part is indirectly supported by cables 0102 (e.g.—housing, receiver, coils, etc.). Whether a first part is supported directly or indirectly by a second part, in general, the first part can be said to be supported by the second part. The term "support by cables" may denote either direct or indirect support by cables.

In some embodiments, a fluid flows into the vent chamber 0730 from the atmosphere, to generate a reaction force for furling or unfurling. In some embodiments, a fluid flows out of the vent chamber 0730 from the atmosphere, to generate a reaction force for furling or unfurling. In some embodiments the fluid is a gas, in others a liquid. In some cases, the fluid is ambient air, in others the fluid is from a similar source as thermal fluid 0104 or irrigation fluid 0105, in other embodiments other fluids may be used. Collectively, such fluids for actuating furling or unfurling by virtue of flow through a vent may be referred to as vent fluids 0106.

In some embodiments, the receiver 0021 may be used to directly heat a process fluid used in a process (e.g.—without limitation, from a material processing process, electrochemical process, electrochemical concentration cell, electrochemical concentration cell process, desalination process, district heating process, solar related process, or other process where heat is used). In some embodiments, the receiver 0021 may allow sensible heat change of a process fluid. In some embodiments, the receiver 0021 may allow evaporation from the process fluid. In some embodiments, the receiver 0021 may allow desirable concentration of a solute, be it metal or non-metal or organic or otherwise, without limitation. In such embodiments, the process fluid may be referred to as a thermal fluid 0104.

In some embodiments an irrigation tubing network 0181 may be employed for irrigation; an irrigation tubing network 0181 may be referred to as an irrigator (which allows irrigation). In some embodiments an irrigation fitting 0511; may be employed for irrigation; an irrigation fitting 0511 may be referred to as an irrigator (an item conveying irrigation fluid 0105 to an area to be irrigated).

In some embodiments, a suspension framework 0010 may comprise one or more of a post 0011, an arm 0013, a structure providing support for suspension.

In some embodiments, actuating fluid 0103 provides energy for furling or unfurling. In some embodiments, actuating fluid 0103 is air; in other embodiments actuating fluid 0103 is comprised of other compressed gases or liquids.

In some embodiments, support 0022 (which may support the receiver 0021 or other items) may be rigid; in others flexible; in others inflatable. In some embodiments, the receiver 0021 may be rigid; in others flexible; in others inflatable; in others inflatable; in others drainable; in others collapsible.

In some embodiments, the entirety or part of sheet 0001 itself may be inflated into a trough reflector type shape, and the entirety or part of sheet 0001 itself may be deflated and furled into a spiral shape (i.e.—inflatable coil 0051 and sheet 0001 may be integrated).

In some embodiments, two or more parts linked to a drum 0041 inflate in a coordinated manner to achieve translation and rotation of the sheet 0001 (e.g.—an accordion inflatable tube for translation, a spiral shape for rotation).

A hanging unfurled reflector sheet 0001 may form a variety of shapes, including a catenary shape, a parabolic shape, a trough shape, or a Fresnel type reflector shape, or a sheet with Fresnel type reflector imprint.

According to an embodiment, sheet 0001 may be furled onto a cylindrical shape drum 0041. In other embodiments, sheet 0001 may be furled onto a flat reel shape drum 0041 (e.g.—a rectangular shape, rectangular wire frame or outline, square shape, square wire frame or outline). In some flat reel shape drum 0041 embodiments, after furling, the flat reel may be stowed in a manner that is more aerodynamic than a cylindrical style drum 0041 reel. In some flat reel embodiments, a Fresnel type reflector is reeled onto the flat reel, with each (square or) rectangular section of the Fresnel reflector effectively the same width at the reel.

In some embodiments, an array of parallelogram linkage modules may be extended and retracted. Each parallelogram modules may be linked to an adjacent parallelogram module. Each parallelogram module achieves an orientation slightly off parallel with the adjacent module, and each module may be mounted to its own reflector, and during extension, an array of reflectors may be positioned in a Fresnel type reflector shape.

In some embodiments, two drums 0041 and 0042 may be employed for furling a sheet 0001 at either end. In some embodiments, one drum 0041 may be fixed to one end of a sheet 0001 only, and furling may be achieved by rotation of said drum 0041 only.

In some embodiments, fluid filled components such as the receiver 0021 or thermal fluid tubing network 0171 or other tubing or other components remain filled or partially filled at all times. In other embodiments, such components may be drained, or partially drained, periodically, or diurnally, or during furling, or according to some other conditions or schedule. Periodic draining may be employed to gain heat from remaining (drained) fluids, to employ remaining fluids for other uses (e.g.—irrigation), to reduce weight of the system (in inclement weather for example), to allow items to collapse for lower wind profile or for other reasons.

In some embodiments, thermal fluid 0104 is transferred (e.g.—by pump or gravity) through the radiation device 0100 to a destination by along (or partially along) an open circuit path (e.g.—not recirculated). In some embodiments, thermal fluid circulates through the radiation device 0100 in a closed circuit. In some embodiments wherein thermal fluid may traverse through radiation device 0100 to a destination in an open circuit, economic viability may be enhanced; for instance because the radiation device 0100 may provide the useful function of conveyance from one location to another (e.g.—across a desert, between buildings, from a pond to a field), and in such cases economic viability may be enhanced.

In some embodiments, the radiation device 0100 may be used to reflect light away from the earth to reduce heat gain of planet earth (which may otherwise occur due to adsorption of solar radiation and attendant dissipation of heat).

In some embodiments, a rack and pinion 0321 may be used to effect drum motion 0041. In other embodiments, a rack and pinion analogue (e.g.—kinematic loop type rotary to linear motion device) may be employed.

Certain plants are listed in this specification as examples of those that may respond favourably to shade or other weather/climate alterations as may be achieved by the device. The plants 0025 that may be cultivated beneficially with the aid of the radiation device 0100 are numerous. One skilled in the art may test the radiation device 0100 (in different dispositions, orientations, logic, design details, etc.) with any plant 0025 and assess the results using methods that are common in the art.

In some embodiments, radiation device 0100 may be mounted on the land of planet earth; in others radiation device 0100 may be mounted in a location that is airborne or waterborne or lunar or Martian or extraterrestrial. In embodiments employed in extraterrestrial use, a benefit of the radiation device 0100 may be lightweight and compact stowage that may be advantageous for extraterrestrial, and another advantage may be that radiation device 0100 may be readily installed.

In some embodiments, a coil spring 0055 causes or promotes furling. In some embodiments, coil spring 0055 may be a torsion spring.

In some embodiments, a single inflatable coil 0051 may be employed; in some more than one; in some none (e.g.—when furling is promoted by other means).

In some embodiments, an inflatable coil 0051 may be attached to both a drum 0041 and a support (for example, to support 0022 or directly by thermal fluid tubing network 0171 or indirectly by thermal fluid tubing network 0171). In other embodiments, solid or flexible or elastic stabilizers may connect to inflatable coil 0051 to promote desired motion and operation.

In some embodiments, elastic materials (cables or others) may be used to promote desired motion during furling or unfurling. For example, a pressurized bellows 0301 or inflatable coil 0051 (inflatables) may actuate unfurling by overcoming an elastic force of an elastic material, and removal of pressure may allow the elastic to initiate furling (e.g.—by allowing the inflatable to return to a central location). In some embodiments, an elastic may be looped through the inflatable coil 0051 (along the path of drum furling) to promote furling.

In some embodiments, the rate of addition or removal of actuating fluid 0103 may be controlled to cause certain components to move at a desired speed (e.g.—to reduce impact forces at the limits of furling, etc.).

In some embodiments, a drum 0041 may be made to operate like a yo-yo; wherein actuating fluid 0103 is rapidly applied, causing drum 0041 to traverse from a central position, after which actuating fluid 0103 is abruptly removed, after which the drum 0041 reaches the extent of the inflatable coil 0051, after which the rotational inertia of the drum 0041 or associated parts initiate refurling (like a yo-yo); for example with the sheet 0001 furled in an opposite sense to that which was achieved hitherto.

In some embodiments, the portion of the sheet 0001 that is last wrapped during furling may be fabricated from a durable material for enhanced resistance to weathering for example, or for better durability when in close proximity to a hot receiver 0021 for example (as compared to other parts of sheet 0001).

In some embodiments, a portion of sheet 0001 that may be directly below receiver 0021 after unfurling may be of a different material or thickness or weight than other parts of sheet 0001 so as to affect the shape of the unfurled sheet 0001 desirably (e.g.—to cause the sheet 0001 to adopt a form that is closer to a parabolic shape than would otherwise be the case for example).

In some embodiments, multiple rows of receiver arrays are linked. In some embodiments, adjacent rows share a common support cable 0102.

In some embodiments shown, the drum 0041 has been shown disposed in a manner that may cause it to interfere with the support 0022 or receiver 0021 during full retraction to a central position as may occur during furling. In some embodiments, it is possible for the drum 0041 to be disposed at a location away from (e.g.—below) the support 0022 or receiver 0021 to avoid such interference.

In some embodiments, the inflatable coil 0051 may be constructed to form a catenary, or near catenary shape substantially throughout the unfurling process (e.g.—with one face of the inflatable coil shorter than the opposing face). Such an inflatable coil 0051 may be located some distance below the support and/or receiver, and the required diameter of the drum 0041 may be relatively reduced (e.g.—if the length of the unfurled sheet 0001 is substantially similar to the traverse path of the inflatable coil 0051). In some embodiments, the inflatable coil 0051 itself may form a trough profile, in others an inverted trough profile.

In some embodiments, a weight attached to a string or cable that is spooled onto the drum 0041 or adjoining cylindrical component may be used to actuate or assist furling (due to the effect of gravity on the weight). In some such embodiments, the string or cable may be wound and unwound onto the drum 0041 or adjoining cylindrical component during furling and unfurling respectively. In some cases, a partially liquid filled cylindrical component, with interior vanes, with water flowing to the lowest surface of the drum, may provide a gravitational force to assist furling.

In some embodiments, a vacuum system of actuating fluid supply system 0060 adjusts the actuating fluid 0103 for furling or unfurling. In some such embodiments, said vacuum system may also be used to apply a vacuum to certain parts for thermal insulation (e.g.—to a vacuum annulus around and integrated with a receiver 0021).

In some embodiments, arm 0013 or 0014 may be post mounted; in other embodiments another type of support or structure may serve as a mounting location for arm 0013 or 0014. In some embodiments arm 0013 may be positioned by positioning system 0090 and a tension member (cable or otherwise) may be linked to the centre of rotation of arm 0014 and apply tension thereto, and by virtue of the said tension, arm 0013 and 0014 may rotate in unison. In some embodiments, a tension member (cable or otherwise) may be linked to the centre of rotation of a receiver 0021 or support 0022 and apply tension thereto, and by virtue of the said tension, arm 0013 and receiver 0021 or support 0022 rotate in unison.

In some embodiments, the sheet 0001 may be reflective, for reflection of radiation. In some embodiments, reflectivity of the sheet 0001 may be reduced for economical use of materials, if for example thermal collection is not a primary objective (or if for example if shading of plants 0025 may be a primary objective).

In some embodiments inflatable coil 0051 may be fabricated to provide resistance to bending in one direction (e.g.—in a direction that would allow drum 0041 to droop excessively or deviate from a desired location). In some such embodiments, one or both sides of the inflatable coil 0051 may be stiffened, of an alternate material, or fabricated from scales or overlapping plates or wedges that furl preferentially in one direction.

In some embodiments, the radiation device 0100 may be implemented to facilitate periodic installation, or reinstallation, or removal, or raising to a higher elevation, or lowering to a lower elevation to facilitate for example periodic activities which may be hourly, daily, monthly, annually, or for harvest, or to allow an alternate use of the area of installation, or according to some other schedule, or according to events. In some embodiments, an advantage of the radiation device 0100 may be that it is readily installed.

In some embodiments arm 0013 may not be mounted directly on a support or post 0011, and a cable may link arm 0013 and a support or post 0011, and arm 0013 may comprise a motor that rotates arm 0013 relative to the said cable (or arm 0013 may be integral with positioning system 0090).

In some embodiments, receiver 0021 may be supported directly from positioning system 0090 or arm 0013 in which case cables 0021 may be said to be integral with positioning system 0090 or arm 0013.

In some embodiments presented, components are described or oriented according to cardinal directions north or south or east or west for clarity of presentation. In other embodiments, system or component orientation with respect to cardinal directions may vary.

Specific embodiments of the present invention have been disclosed; however, several variations of the disclosed embodiments could be envisioned as within the scope of this invention. It is to be understood that the present invention is not limited to the embodiments described above, but encompasses any and all embodiments within the scope of the following claims.

Various embodiments of the invention have been described in detail. Since changes in and or additions to the above-described best mode may be made without departing from the nature, spirit or scope of the invention, the invention is not to be limited to those details but only by the appended claims. Section headings herein are provided as organizational cues. These headings shall not limit or characterize the invention set out in the appended claims.

What is claimed is:

1. A radiation device, comprising:
   a reflective sheet;
   a suspension framework;
   one or more support cables, configured to be attached at each cable end to the suspension framework;
   a receiver disposed above at least a portion of the reflective sheet that is supported by one or more support cables, such that it receives concentrated radiation reflected from the reflective sheet when the reflective sheet is unfurled;
   and a furling and unfurling mechanism comprising:
      one or more drums configured to be attached to one or more ends of the reflective sheet;
      an actuating fluid supply system that supplies the actuating fluid to actuating fluid tubing; and
      a controller that adjusts actuating fluid supply.

2. The radiation device of claim 1, wherein the furling and unfurling mechanism comprises at least one inflatable coil supported on one end by one of the support cables and configured to be attached on the other end to one or more drums.

3. The radiation device of claim 2, wherein the inflatable coils are configured to be attached to coil springs.

4. The radiation device of claim 2, wherein the inflatable coils unfurl when the actuating fluid of claim 1 is released into the inflatable coils.

5. The radiation device of claim 1, wherein the one or more drums are inflatable.

6. The radiation device of claim 1, wherein the one or more support cables are hollow.

7. The radiation device of claim 6, wherein a fluid flows through the one or more support cables.

8. The radiation device of claim 1, further comprising an irrigator suspended from the suspension framework.

9. The radiation device of claim 1, wherein the reflective sheet hangs in a trough shape when in an unfurled position.

10. The radiation device of claim 1, wherein the receiver comprises one or more of: a thermal collector; a photovoltaic cell; or, a device that can both emit and adsorb light.

11. The radiation device of claim 1, wherein one or more lights are suspended from the suspension framework.

12. The radiation device of claim 1, wherein multiple receivers, reflective sheets, and drums are supported by a single suspension framework.

13. The radiation device of claim 1, wherein the suspension framework comprises one or more arms rotating about a vertical axis in unison, wherein at least one support cable extends from the arms.

14. The radiation device of claim 1, wherein the furling and unfurling mechanism comprises: one or more racks configured to be attached to a central inflatable actuator on an end of each rack; and, a pressurized fluid releasable into a central inflatable actuator.

15. The concentration device of claim 1, wherein the furling and unfurling mechanism includes a reaction force to a vent fluid.

16. A method of manipulating weather and climate conditions for plants, comprising:
   erecting a suspension framework;
   attaching one or more support cables to the suspension framework;
   supporting one or more inflatables with the one or more support cables;
   linking one or more drums to the inflatables;
   connecting one or more ends of one or more reflective sheets to the one or more drums;
   disposing a receiver above each reflective sheet,
   and using a controller to release an actuating fluid into the one or more inflatables such that the drums linked to the inflatables rotate and move transversely away from a central position such that a reflective sheet unfurls and hangs from a corresponding drum.

17. The method of claim 16 wherein the one or more inflatables are inflatable coils.

18. The method of claim 16, wherein multiple receivers, reflective sheets, and drums are supported by a single suspension framework.

19. The method of claim 16, wherein the one or more support cables are hollow.

20. The method of claim 16, wherein the one or more reflective sheets are furled or unfurled or positioned based on:
    time of day, incoming radiation intensity, incoming radiation direction, level of specular incoming radiation, level of diffuse incoming radiation, wind speed, level and/or quality of ambient airborne dust and/or debris, presence of animal pests that may interfere, ambient temperature, desired plant lighting intensity and duration for plants beneath the system, desired plant water duration and intensity for plants beneath the system, estimated night sky temperature with respect to radiative losses from plants beneath the system, availability of actuating fluids, demand for heat from heat load, manual instruction/override, latitude, longitude, and/or location.

21. A radiation device, comprising:
    a reflective sheet;
    a suspension framework;
    one or more support cables, configured to be attached at each cable end to the suspension framework;
    a receiver disposed above at least a portion of the reflective sheet that is supported by one or more support cables, such that it receives concentrated radiation reflected from the reflective sheet when the reflective sheet is unfurled;
    a furling and unfurling mechanism;
    one or more drums configured to be attached to one or more ends of the reflective sheet;
    an actuating fluid that actuates furling or unfurling;
    an actuating fluid supply system configured to provide pressure or vacuum to the actuating fluid.

22. A radiation device, comprising:
    a reflective sheet;
    a suspension framework;
    one or more support cables, configured to be attached at each cable end to the suspension framework;
    a receiver disposed above at least a portion of the reflective sheet that is supported by one or more support cables, such that it receives concentrated radiation reflected from the reflective sheet when the reflective sheet is unfurled;
    a furling and unfurling mechanism;
    one or more drums configured to be attached to one or more ends of the reflective sheet;
    an actuating fluid that actuates furling or unfurling;
    a compressor and/or vacuum pump system configured to provide pressure or vacuum to the actuating fluid.

23. A radiation device, comprising:
    a reflective sheet;
    a suspension framework;
    one or more support cables, configured to be attached at each cable end to the suspension framework;
    a receiver disposed above at least a portion of the reflective sheet that is supported by one or more support cables, such that it receives concentrated radiation reflected from the reflective sheet when the reflective sheet is unfurled;
    a furling and unfurling mechanism;
    one or more drums configured to be attached to one or more ends of the reflective sheet;
    an actuating fluid that actuates furling or unfurling;
    an actuating fluid source that is controlled by a controller to adjust actuating fluid supply;
    wherein the furling and unfurling mechanism comprises at least one inflatable supported on one end by one of the support cables.

* * * * *